United States Patent
Block et al.

(10) Patent No.: US 12,533,358 B1
(45) Date of Patent: Jan. 27, 2026

(54) METHODS OF TREATMENT WITH ELINZANETANT

(71) Applicants: Bayer Consumer Care AG, Basel (CH); Emerald Lake Safety LLC, Corona Del Mar, CA (US)

(72) Inventors: Michael Block, Basel (CH); Stefan Willmann, Basel (CH); Alexander Solms, Basel (CH); Annika Ruth Patricia Schneider, Basel (CH); Marcus-Hillert Schultze-Mosgau, Basel (CH)

(73) Assignees: Bayer Consumer Care AG, Basel (CH); Emerald Lake Safety LLC, Newport Beach, CA (US)

( * ) Notice: Subject to any disclaimer, the term of this patent is extended or adjusted under 35 U.S.C. 154(b) by 0 days.

(21) Appl. No.: 19/208,416

(22) Filed: May 14, 2025

(51) Int. Cl.
*A61K 31/5383* (2006.01)
*A61P 15/12* (2006.01)

(52) U.S. Cl.
CPC .......... *A61K 31/5383* (2013.01); *A61P 15/12* (2018.01)

(58) Field of Classification Search
CPC ........................... A61K 31/5383; A61P 15/12
See application file for complete search history.

(56) References Cited

U.S. PATENT DOCUMENTS

| | | |
|---|---|---|
| 7,683,056 B2 | 3/2010 | Alvaro et al. |
| 7,919,491 B2 | 4/2011 | Alvaro et al. |
| 8,093,242 B2 | 1/2012 | Anderton et al. |
| 8,097,618 B2 | 1/2012 | Alvaro et al. |
| 8,796,269 B2 | 8/2014 | Craig et al. |
| 10,195,205 B2 | 2/2019 | Trower |
| 10,774,091 B2 | 9/2020 | Trower et al. |
| 11,591,346 B2 | 2/2023 | Trower et al. |
| 11,767,328 B2 | 9/2023 | Trower et al. |
| 11,787,820 B2 | 10/2023 | Trower et al. |
| 12,264,164 B2 | 4/2025 | Trower et al. |
| 2002/0016283 A1 | 2/2002 | Guttuso |
| 2003/0092602 A1 | 5/2003 | Leach et al. |
| 2005/0110987 A1 | 5/2005 | Furman et al. |
| 2006/0014788 A1 | 1/2006 | Gumkowski et al. |
| 2006/0014818 A1 | 1/2006 | Paulini et al. |
| 2012/0028980 A1 | 2/2012 | Boscan et al. |
| 2012/0157450 A1 | 6/2012 | Craig et al. |
| 2013/0338180 A1 | 12/2013 | Parvataneni et al. |
| 2016/0339037 A1 | 11/2016 | Trower |

(Continued)

FOREIGN PATENT DOCUMENTS

| | | |
|---|---|---|
| CN | 1200674 A | 12/1998 |
| EP | 1192952 A2 | 4/2002 |

(Continued)

OTHER PUBLICATIONS

Kane et al., Mayo Clin Proc. 2000;75:933-942 (Year: 2000).*

(Continued)

*Primary Examiner* — San Ming R Hui

(74) *Attorney, Agent, or Firm* — COOLEY LLP

(57) ABSTRACT

The present disclosure relates to methods of treating vasomotor symptoms in a female subject in need thereof by administering a therapeutically effective amount of elinzanetant or a pharmaceutically acceptable salt or deuterated thereof, wherein the female subject is concurrently administered with a moderate CYP3A4 inhibitor.

27 Claims, 4 Drawing Sheets

(56) References Cited

U.S. PATENT DOCUMENTS

| | | |
|---|---|---|
| 2019/0284205 A1 | 9/2019 | Trower et al. |
| 2020/0361956 A1 | 11/2020 | Trower et al. |
| 2020/0361957 A1 | 11/2020 | Trower et al. |
| 2021/0128574 A1 | 5/2021 | Trower |
| 2021/0236506 A1 | 8/2021 | Trower |
| 2023/0002322 A1 | 1/2023 | Schleusner et al. |
| 2023/0174552 A1 | 6/2023 | Trower et al. |
| 2023/0382922 A1 | 11/2023 | Trower et al. |
| 2025/0154167 A1 | 5/2025 | Trower et al. |

FOREIGN PATENT DOCUMENTS

| | | |
|---|---|---|
| JP | 2010502703 A | 1/2010 |
| JP | 2014507463 A | 3/2014 |
| JP | 2015516418 A | 6/2015 |
| WO | WO-9603138 A1 | 2/1996 |
| WO | WO-0043008 A1 | 7/2000 |
| WO | WO-0059873 A1 | 10/2000 |
| WO | WO-0195904 A1 | 12/2001 |
| WO | WO-02089802 A2 | 11/2002 |
| WO | WO-03000295 A2 | 1/2003 |
| WO | WO-02089802 A3 | 5/2003 |
| WO | WO-2004056799 A2 | 7/2004 |
| WO | WO-2004056805 A1 | 7/2004 |
| WO | WO-2005002577 A1 | 1/2005 |
| WO | WO-2005097774 A1 | 10/2005 |
| WO | WO-2005097794 A1 | 10/2005 |
| WO | WO-2005110987 A1 | 11/2005 |
| WO | WO-2006013050 A1 | 2/2006 |
| WO | WO-2006013205 A1 | 2/2006 |
| WO | WO-2007028654 A1 | 3/2007 |
| WO | WO-2008030389 A2 | 3/2008 |
| WO | WO-2008128891 A1 | 10/2008 |
| WO | WO-2010015626 A1 | 2/2010 |
| WO | WO-2011023733 A1 | 3/2011 |
| WO | WO-2011131571 A1 | 10/2011 |
| WO | WO-2012020162 A1 | 2/2012 |
| WO | WO-2012120328 A1 | 9/2012 |
| WO | WO-2013082388 A1 | 6/2013 |
| WO | WO-2013147452 A1 | 10/2013 |
| WO | WO-2013169520 A1 | 11/2013 |
| WO | WO-2014089019 A1 | 6/2014 |
| WO | WO-2014154895 A1 | 10/2014 |
| WO | WO-2015033163 A1 | 3/2015 |
| WO | WO-2016184829 A1 | 11/2016 |
| WO | WO-2019175253 A1 | 9/2019 |
| WO | WO-2021094247 A1 | 5/2021 |
| WO | WO-2023147134 A2 * | 8/2023 ......... A61K 31/4545 |

OTHER PUBLICATIONS

Willmann, CPT Pharmacometrics Syst Pharmacol. 2024; 13:2137-2149 (Year: 2024).*
Simon et al., Menopause, vol. 30, No. 3, 2023, p. 239-246 (Year: 2023).*
Abel et al., "Stereologic study of the hypothalamic infundibular nucleus in young and older women", Journal of Comparative Neurology (Sep. 2000); 424(4): 679-688. doi: 10.1002/1096-9861(20000904)424:4679::aid-cne93.0.co;2-I.
Abel et al., "The effects of hormone replacement therapy on hypothalamic neuropeptide gene expression in a primate model of menopause", Journal of Clinical Endocrinology & Metabolism (Jun. 1999); 84(6): 2111-2118. doi: 10.1210/jcem.84.6.5689.
Andersen et al., "Sleep disturbance induced by substance P in mice", Behavioural Brain Research (Feb. 2006); 167(2): 212-218. doi: 10.1016/j.bbr.2005.09.008. Epub Oct. 11, 2005.
Angeliq (drospirenone and estradiol) tablets, for oral use, Angeliq 0.25 mg DRSP/0.5 mg E2 tablet: one tablet contains 0.25 mg drospirenone and 0.5 mg estradiol (3), Angeliq 0.5 mg DRSP/1 mg E2 tablet: one tablet contains 0.5 mg drospirenone and 1 mg estradiol (3), Label; Highlights of Prescribing Information, Patient Information approved by the U.S. Food and Drug Administration; Revised: Nov. 2017 (Nov. 2017), Initial U.S. Approval: 2005, Bayer HealthCare Pharmaceuticals Inc. Whippany, NJ 07981; 28 pages.
Archer et al., "A double-blind, randomly assigned, placebo-controlled study of desvenlafaxine efficacy and safety for the treatment of vasomotor symptoms associated with menopause", American Journal of Obstetrics and Gynecology (Feb. 2009); 200(2): 172.e1-10. doi: 10.1016/j.ajog.2008.09.877. Epub Dec. 25, 2008.
Archer et al., "A randomized, double-blind, placebo-controlled study of the lowest effective dose of drospirenone with 17A-estradiol for moderate to severe vasomotor symptoms in postmenopausal women", Menopause: The Journal of The North American Menopause Society (Mar. 2014); 21(3): 227-235. doi: 10.1097/GME.0b013e31829c1431.
Arisawa, et al., "Stimulatory role of substance P on gonadotropin release in ovariectomized rats", Neuroendocrinology, (May 1990); 51(5): 523-529. doi: 10.1159/000125386.
Aulton. "Pharmaceutics—The Science of Dosage Form Design", Second Edition, Churchill Livingstone (2001); 1-679; 682 total pages.
Azziz et al., "Positions statement: criteria for defining polycystic ovary syndrome as a predominantly hyperandrogenic syndrome: an Androgen Excess Society guideline", The Journal of Clinical Endocrinology & Metabolism (Nov. 2006); 91(11): 4237-4245. doi: 10.1210/jc.2006-0178. Epub Aug. 29, 2006.
Bardia et al., "Pilot evaluation of Aprepitant for the treatment of hot flashes", Supportive Cancer Therapy (Jul. 2006); 2(4): 240-246. doi: 10.3816/SCT.2006.n.022.
Berge et al., "Pharmaceutical salts," J Pharm Sci. Jan. 1977; 66(1): 1-19.
Bergström et al., "Human positron emission tomography studies of brain neurokinin 1 receptor occupancy by aprepitant", Biological Psychiatry (May 2004); 55(10): 1007-1012. doi: 10.1016/j.biopsych.2004.02.007.
Bertrand et al., "Capsaicin Increases Airflow Resistance in Guinea Pigs In Vivo by Adivating both N~ and NK1 Tachykinin Receptors", American Review of Respiratory Disease (Oct. 1993); 148: 909-914. doi: 10.1164/ajrccm/148.4_Pt_1.909.
Biissantz et al., "Identification of a crucial amino acid in the helix position 6.51 of human tachykinin neurokinin 1 and 3 receptors contributing to the insurmountable mode of antagonism by dual NK1/NK3 antagonists", Journal of Medicinal Chemistry (Jun. 2012); 55(11): 5061-5076. doi: 10.1021/jm2017072. Epub May 22, 2012.
Billings, et al., "Neurokinin B acts via the neurokinin-3 receptor in the retrochiasmatic area to stimulate luteinizing hormone secretion in sheep", Endocrinology (Aug. 2010); 151(8): 3836-3846. doi: 10.1210/en.2010-0174. Epub Jun. 2, 2010.
Biran et al., "Direct regulation of gonadotropin release by neurokinin B in tilapia (*Oreochromis niloticus*)", Endocrinology (Dec. 2014); 155(12): 4831-4842. doi: 10.1210/en.2013-2114. Epub Sep. 11, 2014.
Borsay et al., "Hypophysiotropic gonadotropin-releasing hormone projections are exposed to dense plexuses of kisspeptin, neurokinin B and substance p immunoreactive fibers in the human: a study on tissues from postmenopausal women", Neuroendocrinology (2015); 100(2-3): 141-152. doi: 10.1159/000368362. Epub Sep. 19, 2014.
Bouchard et al., "Randomized placebo- and active-controlled study of desvenlafaxine for menopausal vasomotor symptoms", Climacteric (Feb. 2012); 15(1): 12-20. doi: 10.3109/13697137.2011.586445. Epub Nov. 8, 2011.
BRISDELLE® (paroxetine) capsules, for oral use, Capsules: 7.5 mg (3), Label; Highlights of Prescribing Information, Medication Guide approved by the U.S. Food and Drug Administration; Revised: Jan. 2017 (Jan. 2017), Initial U.S. Approval: 1992, Reference ID: 4036886, Distributed by: Sebela Pharmaceuticals inc. 645 Hembree Parkway, Suite I, Roswell, Georgia 30076; 27 pages.
Brown et al., "Gonadal steroid regulation of substance P (SP) and SP-encoding messenger ribonucleic acids in the rat anterior pituitary and hypothalamus", Endocrinology (Jan. 1990); 126(1): 330-340. doi: 10.1210/endo-126-1-330.
Brylla et al., "Coexpression of preprotachykinin A and B transcripts in the bovine corpus luteum and evidence for functional neurokinin

(56) References Cited

OTHER PUBLICATIONS receptor activity in luteal endothelial cells and ovarian macrophages", Regulatory Peptides (Feb. 2005); 125(1-3): 125-133. doi: 10.1016/j.regpep.2004.08.003.

Burke et al., "Coexpression of dynorphin and neurokinin B immunoreactivity in the rat hypothalamus: morphologic evidence of interrelated function within the arcuate nucleus", Journal of Comparative Neurology (Oct. 2006); 498(5): 712-726. doi: 10.1002/cne.21086.

Buster et al., "Low-dose estradiol spray to treat vasomotor symptoms: a randomized controlled trial", Obstetrics & Gynecology (Jun. 2008); 111(6): 1343-1351. doi: 10.1097/AOG.0b013e318175d162.

Cai et al., "General Practitioner's Drug Manual (2nd edition)", Shanghai Scientific and Technical Publishers (Oct. 2013); p. 350; 4 total pages with English Translation.

Cai. "Gonarelin for Injection", Shanghai Science and Technology Press (2013); p. 350; 2 total pages with English Translation.

Candenas et al., "Changes in the expression of tachykinin receptors in the rat uterus during the course of pregnancy", Biology of Reproduction (Aug. 2001); 65(2): 538-543. doi: 10.1095/biolreprod65.2.538.

Casper et al., "Menopausal flushes: a neuroendocrine link with pulsatile luteinizing hormone secretion", Science (Aug. 1979); 205(4408): 823-825. doi: 10.1126/science.462193.

Casper et al., "Menopausal flushes: effect of pituitary gonadotropin desensitization by a potent luteinizing hormone-releasing factor agonist", The Journal of Clinical Endocrinology & Metabolism (Nov. 1981); 53(5): 1056-1058. doi: 10.1210/jcem-53-5-1056.

Catalani et al., "Identification of novel NK1/NK3 dual antagonists for the potential treatment of schizophrenia", Bioorganic & Medicinal Chemistry Letters (Nov. 2011); 21(22): 6899-6904. doi: 10.1016/j.bmcl.2011.07.116. Epub Aug. 6, 2011.

Chawla et al., "Localization of neurons expressing substance P and neurokinin B gene transcripts in the human hypothalamus and basal forebrain", Journal of Comparative Neurology (Aug. 1997); 384(3): 429-442. doi: 10.1002/(sici) 1096-9861(19970804)384:3429::aid-cne83.0.co;2-5.

Cheng et al., "The kisspeptin/neurokinin B/dynorphin (KNDy) cell population of the arcuate nucleus: sex differences and effects of prenatal testosterone in sheep", Endocrinology (Jan. 2010); 151(1): 301-311. doi: 10.1210/en.2009-0541. Epub Oct. 30, 2009.

Ciofi et al., "Presence of nuclear androgen receptor-like immunoreactivity in neurokinin B-containing neurons of the hypothalamic arcuate nucleus of the adult male rat", Neuroscience Letters (Dec. 1994); 182(2): 193-196. doi: 10.1016/0304-3940(94)90795-1.

Crandall et al., "Association of genetic variation in the tachykinin receptor 3 locus with hot flashes and night sweats in the Women's Health Initiative Study", Menopause (Mar. 2017); 24(3): 252-261. doi: 10.1097/GME.0000000000000763.

Dacks et al., "Activation of neurokinin 3 receptors in the median preoptic nucleus decreases core temperature in the rat." Endocrinology (Dec. 2011); 152(12): 4894-4905. doi: 10.1210/en.2011-1492. Epub Oct. 25, 2011.

Daoui et al., "Involvement of Tachykinin NK3 Receptors in Citric Acid-induced Cough and Bronchial Response in Guinea Pigs", American Journal of Respiratory and Critical Care Medicine (Jul. 1998); 158(1): 42-48. doi: 10.1164/ajrccm.158.1.9705052.

Dawson et al., "Progress in the development of neurokinin 3 modulators for the treatment of schizophrenia: molecule development and clinical progress", Future Medicinal Chemistry (Sep. 2013); 5(13): 1525-1546. doi: 10.4155/fmc.13.122.

De Croft et al., "Neurokinin B activates arcuate kisspeptin neurons through multiple tachykinin receptors in the male mouse", Endocrinology (Aug. 2013); 154(8): 2750-2760. doi: 10.1210/en.2013-1231. Epub Jun. 6, 2013.

Dellovade et al., "Estrogen regulation of neurokinin B gene expression in the mouse arcuate nucleus is mediated by estrogen receptor alpha", Endocrinology (Feb. 2004); 145(2): 736-742.doi: 10.1210/en.2003-0894. Epub Oct. 30, 2003.

Dimasi et al., "Trends in Risks Associated With New Drug Development: Success Rates for Investigational Drugs", Clinical Pharmacology & Therapeutics (Mar. 2010); 87(3): 272-277. doi: 10.1038/clpt.2009.295. Epub Feb. 3, 2010.

Divigel (estradiol gel) 0.1%, Single-dose 0.25, 0.5, and 1.0 gram gel-filled foil packets containing 0.25, 0.5, and 1 mg estradiol, respectively. (3), Label; Highlights of Prescribing Information, Patient Counseling Information and patient labeling approved by the U.S. Food and Drug Administration; Revised: Oct. 2017 (Oct. 2017), Initial U.S. Approval: 1975, Reference ID: 4175160, Distributed by Vertical Pharmaceuticals, LLC, Bridgewater, NJ 08807 USA; 24 pages.

DUAVEE® (conjugated estrogens/bazedoxifene) tablets for oral use, Tablet containing conjugated estrogens 0.45 mg and bazedoxifene 20 mg (3), Label; Highlights of Prescribing Information, Patient Information approved by the U.S. Food and Drug Administration; Revised: Nov. 2017 (Nov. 2017), Initial U.S. Approval: 2013, Reference ID: 4175163, Distributed by: Wyeth Pharmacemicals Inc., a Subsidiary of Pfizer Inc., Philadelphia, PA 19101; 32 pages.

Ebede et al., "Hormonal Treatment of Acne in Women", The Journal of Clinical and Aesthetic Dermatology (Dec. 2009); 2(12):16-22.

Elinzanetant (Lynkuet), 60 mg soft capsules, Bayer PLC, United Kingdom, Label, Marketing Authorisation Nos. PL 00010/0759, Date of First Authorisation/Renewal of the Authorisation Aug. 7, 2025, Date of Revision of the Text Aug. 7, 2025, 19 pages.

Emend (aprepitant) capsules, for oral use, Capsules: 40 mg; 80 mg; 125 mg (3), Label; Highlights of Prescribing Information, Patient Counseling Information approved by the U.S. Food and Drug Administration; Revised: Dec. 2012 (Dec. 2012), Initial U.S. Approval: 2003, Reference ID: 3283529, Manufactured by: DSM Pharmaceuticals, Inc., 5900 Martin Luther King Jr. Highway, Greenville, NC 27834, USA; 48 pages.

Endo et al., "Effects of senktide, a neurokinin 3 receptor agonist, on luteinizing hormone secretion and follicular development in anestrous Shiba goats: a pilot study", BMC Research Notes (Nov. 2014); 7(773): 1-5. doi: 10.1186/1756-0500-7-773.

Escobar-Morreale et al., "Epidemiology, diagnosis and management of hirsutism: a consensus statement by the Androgen Excess and Polycystic Ovary Syndrome Society", Human Reproduction Update (Mar.-Apr. 2012); 18(2): 146-170. doi: 10.1093/humupd/dmr042. Epub Nov. 6, 2011.

Evamist Nov. 2017 (estradiol transdermal spray), NDA 022014, One spray consists of 90 mcL which contains 1.53 mg estradiol (3), Label; Highlights of Prescribing Information, Patient Information and Instructions for Use approved by the U.S. Food and Drug Administration; Revised: Aug. 2017 (Aug. 2017), Initial U.S. Approval: 1975, Reference ID: 4175246, Manufactured for: Perrigo®, Minneapolis, MN 55427; 42 pages.

Femoston-Conti 0.5 mg /2.5 mg, film-coated tablets, Package Leaflet: Information for the User; Revised: Jun. 2017 (Jun. 2017), Manufactuerer: Abbott Biologicals B.V., Veerweg 12, 8121 AA Olst, The Netherlands; 10 pages.

Fergani et al., "Do substance P and neurokinin A play important roles in the control of LH secretion in ewes?", Endocrinology (Dec. 2016); 157(12): 4829-4841. doi: 10.1210/en.2016-1565. Epub Oct. 5, 2016.

Fleury et al., "A pharmacokinetic-pharmacodynamic model for cardiovascular safety assessment", Journal of Pharmacological and Toxicological Methods (Jan.-Feb. 2011); 63(1): 123-133. doi: 10.1016/j.vascn.2010.08.003. Epub Aug. 21, 2010.

Foulon et al., "Nk1 and NK2 Receptors Mediate Tachykinin and Resiniferatoxin-Induced Bronchospasm in Guinea Pigs", American Review of Respiratory Disease (Oct. 1993); 148(4 Pt 1): 915-921. doi: 10.1164/ajrccm/148.4_Pt_1.915.

Francou et al., "Normosmic congenital hypogonadotropic hypogonadism due to TAC3/TACR3 mutations: characterization of neuroendocrine phenotypes and novel mutations", PloS One (2011); 6(10): e25614, 11 pages. doi: 10.1371/journal.pone.0025614. Epub Oct. 21, 2011.

Fukami et al., "Hypothalamic dysfunction in a female with isolated hypogonadotropic hypogonadism and compound heterozygous TACR3 mutations and clinical manifestation in her heterozygous mother", Hormone Research in Paediatrics (2010); 73(6): 477-481. doi: 10.1159/000313373. Epub Apr. 15, 2010.

(56) References Cited

OTHER PUBLICATIONS

García-Ortega et al., "Expression of neurokinin B/NK3 receptor and kisspeptin/KISS1 receptor in human granulosa cells", Human Reproduction (Dec. 2014); 29(12): 2736-2746. doi: 10.1093/humrep/deu247. Epub Oct. 14, 2014.

García-Ortega et al., "Expression of tachykinins and tachykinin receptors and interaction with kisspeptin in human granulosa and cumulus cells", Biology of Reproduction (Jun. 2016); 94(6): 124, 1-10. doi: 10.1095/biolreprod.116.139881. Epub May 4, 2016.

Garcia-Galiano, et al., "Kisspeptin signaling is indispensable for neurokinin B, but not glutamate, stimulation of gonadotropin secretion in mice", Endocrinology (Jan. 2012); 153(1): 316-328. doi: 10.1210/en.2011-1260. Epub Nov. 8, 2011.

Garcia-Recio et al., "Biological and Pharmacological Aspects of the NK1-Receptor," BioMed Research International (2015); 2015(1): 495704; 14 pages. doi: 10.1155/2015/495704. Epub Sep. 3, 2015.

George et al., "OR27-3 The Neurokinin B Receptor Antagonist AZD4901 Decreases LH and Testosterone Secretion in Women with PCOS: A Randomised, Double-Blind, Placebo-Controlled Clinical Trial", Program: Abstracts-Orals, Poster Previews, and Posters; Session: OR27-Hyperandrogenic Ovarian Dysfunction; Basic/Clinical; San Diego Convention Center (Mar. 7, 2015); 2 pages.

Gianetti et al., "TAC3/TACR3 mutations reveal preferential activation of gonadotropin-releasing hormone release by neurokinin B in neonatal life followed by reversal in adulthood", The Journal of Clinical Endocrinology & Metabolism (Jun. 2010); 5(6): 2857-2867. doi: 10.1210/jc.2009-2320. Epub Mar. 23, 2010.

Gogos et al., "A role for estrogen in schizophrenia: clinical and preclinical findings", International Journal of Endocrinology (2015); 2015(1): 615356; 16 pages. doi: 10.1155/2015/615356. Epub Sep. 27, 2015.

Gollnick et al., "Management of acne: a report from a Global Alliance to Improve Outcomes in Acne", Journal of the American Academy of Dermatology (Jul. 2003); 49(1): S1-S37. doi: 10.1067/mjd.2003.618.

Gonzalez-Santana et al., "Altered expression of the tachykinins substance P/neurokinin A/hemokinin-1 and their preferred neurokinin 1/neurokinin 2 receptors in uterine leiomyomata", Fertility and Sterility (Nov. 2016); 106(6): 1521-1529. doi: 10.1016/j.fertnstert.2016.07.007. Epub Jul. 25, 2016.

Gullapalli. "Soft gelatin capsules (softgels)", Journal of Pharmaceutical Sciences (Oct. 2010); 99(10): 4107-4148. doi: 10.1002/jps.22151.

Gupta et al., "Formulation strategies to improve the bioavailability of poorly absorbed drugs with special emphasis on self-emulsifying systems", International Scholarly Research Notices (Dec. 2013); 2013(848043); 16 pages. doi: 10.1155/2013/848043.

Guran et al., "Hypogonadotropic hypogonadism due to a novel missense mutation in the first extracellular loop of the neurokinin B receptor", The Journal of Clinical Endocrinology & Metabolism (Oct. 2009); 94(10): 3633-3639. doi: 10.1210/jc.2009-0551. Epub Sep. 15, 2009.

Hanessian et al., "Design and synthesis of potential dual NK1/NK3 receptor antagonists", Bioorganic & Medicinal Chemistry Letters (Jan. 2014); 24(2): 510-514. doi: 10.1016/j.bmcl.2013.12.033. Epub Dec. 15, 2013.

Hanessian et al., "Design, synthesis, and optimization of balanced dual NK1/NK3 receptor antagonists", ACS Medicinal Chemistry Letters (Feb. 2014); 5(5): 550-555. doi: 10.1021/ml400528y.

Hedrick et al., "Transdermal estradiol gel 0.1% for the treatment of vasomotor symptoms in postmenopausal women", Menopause (2009); 16(1): 132-140. doi: 10.1097/GME.0b013e31817d5372.

Hoveyda et al., "Discovery and optimization of novel antagonists to the human neurokinin-3 receptor for the treatment of sex-hormone disorders (Part I)", Journal of Medicinal Chemistry (Apr. 2015); 58(7): 3060-3082. doi: 10.1021/jm5017413. Epub Mar. 18, 2015.

Hrabovszky et al., "Low degree of overlap between kisspeptin, neurokinin B, and dynorphin immunoreactivities in the infundibular nucleus of young male human subjects challenges the KNDy neuron concept", Endocrinology (Oct. 2012); 153(10): 4978-4989. doi: 10.1210/en.2012-1545. Epub Aug. 17, 2012.

Hrabovszky et al., "The kisspeptin system of the human hypothalamus: sexual dimorphism and relationship with gonadotropin-releasing hormone and neurokinin B neurons", European Journal of Neuroscience (Jun. 2010); 31(11): 1984-1998. doi: 10.1111/j.1460-9568.2010.07239.x. Epub Jun. 1, 2010.

Hrabovszky et al., "Substance P immunoreactivity exhibits frequent colocalization with kisspeptin and neurokinin B in the human infundibular region", PloS One (Aug. 2013); 8(8): e72369; 11 pages. doi: 10.1371/journal.pone.0072369.

Jayasena et al., "Neurokinin B administration induces hot flushes in women", Scientific Reports (Feb. 2015); 5(1): 8466; 7 pages. doi: 10.1038/srep08466.

Kalil et al., "The distribution of substance P and kisspeptin in the mediobasal hypothalamus of the male rhesus monkey and a comparison of intravenous administration of these peptides to release GnRH as reflected by LH secretion", Neuroendocrinology (2016); 103(6): 711-723. doi: 10.1159/000442420. Epub Nov. 19, 2015.

KaNDy Therapeutics, "KaNDy Therapeutics launched to advance a breakthrough treatment in Women's Health", Press Release (Sep. 27, 2017); 2 pages.

Karagiannides et al., "Substance P (SP)-Neurokinin-1 Receptor (NK-1R) Alters Adipose Tissue Responses to High-Fat Diet and Insulin Action", Endocrinology (Jun. 2011); 152(6): 2197-2205. doi: 10.1210/en.2010-1345. Epub Apr. 5, 2011.

Karsch. "Central actions of ovarian steroids in the feedback regulation of pulsatile secretion of luteinizing hormone", Annual Review of Physiology (1987); 49: 365-382. doi: 10.1146/annurev.ph.49.030187.002053.

Kinsey-Jones et al., "The inhibitory effects of neurokinin B on GnRH pulse generator frequency in the female rat", Endocrinology (Jan. 2012); 153(1): 307-315. doi: 10.1210/en.2011-1641. Epub Nov. 22, 2011.

Krajewski et al., "Forebrain projections of arcuate neurokinin B neurons demonstrated by anterograde tract-tracing and monosodium glutamate lesions in the rat", Neuroscience (Mar. 2010); 166(2): 680-697. doi: 10.1016/j.neuroscience.2009.12.053. Epub Dec. 28, 2009.

Krajewski et al., "Morphologic evidence that neurokinin B modulates gonadotropin-releasing hormone secretion via neurokinin 3 receptors in the rat median eminence", Journal of Comparative Neurology (2005); 489(3): 372-386. doi: 10.1002/cne.20626.

Krajewski-Hall et al., "Estradiol alters body temperature regulation in the female mouse", Temperature (2018); 5(1): 56-69. doi: 10.1080/23328940.2017.1384090.

Kravitz et al., "Sleep during the perimenopause: a SWAN story", Obstetrics and Gynecology Clinics of North America (Sep. 2011); 38(3): 567-586. doi: 10.1016/j.ogc.2011.06.002.

Larsen. "Distribution of substance P-immunoreactive elements in the preoptic area and the hypothalamus of the rat", Journal of Comparative Neurology (1992); 316(3): 287-313. doi: 10.1002/cne.903160304.

Lasaga et al., "Tachykinins and the hypothalamicuitary-gonadal axis: An update", Peptides (Sep. 2011); 32(9): 1972-1978. doi: 10.1016/j.peptides.2011.07.009. Epub Jul. 27, 2011.

Lee et al., "Influence of substance-P on cultured sebocytes", Archives of Dermatological Research (Jul. 2008); 300(6): 311-316. doi: 10.1007/s00403-008-0854-1. Epub Apr. 22, 2008.

Lehman et al., "Minireview: kisspeptin/neurokinin B/dynorphin (KNDy) cells of the arcuate nucleus: a central node in the control of gonadotropin-releasing hormone secretion", Endocrinology (Aug. 2010); 151(8): 3479-3489. doi: 10.1210/en.2010-0022. Epub May 25, 2010.

Li et al., "Evidence that Neurokinin B Controls Basal Gonadotropin-Releasing Hormone Secretion but Is Not Critical for Estrogen-Positive Feedback in Sheep", Neuroendocrinology (2015); 101(2):161-174. doi: 10.1159/000377702. Epub Feb. 12, 2015.

Li et al., "Women's Healthy During Menopause," China Peking Union Medical College Press (Jan. 31, 2008); p. 43; 5 total pages with English Translation.

Lieb et al., "Effects of the neuropeptide substance P on sleep, mood, and neuroendocrine measures in healthy young men",

(56) References Cited

OTHER PUBLICATIONS

Neuropsychopharmacology (Dec. 2002); 27(6): 1041-1049. doi: 10.1016/S0893-133X(02)00369-X.

Litman et al., "The Selective Neurokinin 3 Antagonist AZD2624 Does Not Improve Symptoms or Cognition in Schizophrenia", Journal of Clinical Psychopharmacology (Apr. 2014); 34(2): 199-204. doi: 10.1097/JCP.0000000000000071.

Louis et al., "Additional evidence for anxiolytic-and antidepressant-like activities of saredutant (SR48968), an antagonist at the neurokinin-2 receptor in various rodent-models", Pharmacology Biochemistry and Behavior (Mar. 2008); 89(1): 36-45. doi: 10.1016/j.pbb.2007.10.020. Epub Nov. 5, 2007.

Lucky et al., "Plasma androgens in women with acne vulgaris", Journal of Investigative Dermatology (Jul. 1983); 81(1): 70-74. doi: 10.1111/1523-1747.ep12539043.

Maclennan et al., "Oral oestrogen and combined oestrogen/progestogen therapy versus placebo for hot flushes", Cochrane Database of Systematic Reviews (Oct. 2004); 2004(4): CD002978; 79 pages. doi: 10.1002/14651858.CD002978.pub2.

Maguire et al., "The Role of Substance P in the Central Control of Food Intake", Program: Abstracts Orals, Posters Previews, and Poster; Session: SAT 542-571—Energy Balance: Control of Adiposity and Feeding Basic, San Diego Convention Center (Mar. 7, 2015); 1 page.

Malherbe et al., "Characterization of RO4583298 as a novel potent, dual antagonist with in vivo activity at tachykinin NK1 and NK3 receptors", British Journal of Pharmacology (Feb. 2011); 162(4): 929-946. doi: 10.1111/j.1476-5381.2010.01096.x.

Malherbe et al., "Tachykinin neurokinin 3 receptor antagonists: a patent review (2005-2010)", Expert Opinion on Therapeutic Patents (May 2011); 21(5): 637-655. doi: 10.1517/13543776.2011.568482. Epub Mar. 21, 2011.

Mckinnon et al., "Induction of the neurokinin 1 receptor by TNFα in endometriotic tissue provides the potential for neurogenic control over endometriotic lesion growth", The Journal of Clinical Endocrinology & Metabolism (Jun. 2013); 98(6): 2469-2477. doi: 10.1210/jc.2013-1019. Epub Apr. 3, 2013.

Merkley et al., "KNDy (kisspeptin/neurokinin B/dynorphin) neurons are activated during both pulsatile and surge secretion of LH in the ewe", Endocrinology (Nov. 2012); 153(11): 5406-5414. doi: 10.1210/en.2012-1357. Epub Sep. 18, 2012.

Millar et al., "Current and future applications of GnRH, kisspeptin and neurokinin B analogues", Nature Reviews Endocrinology (Aug. 2013); 9(8): 451-466. doi: 10.1038/nrendo.2013.120. Epub Jul. 2, 2013.

Mittelman-Smith et al., "Arcuate kisspeptin/neurokinin B/dynorphin (KNDy) neurons mediate the estrogen suppression of gonadotropin secretion and body weight", Endocrinology (Jun. 2012); 153(6): 2800-2812. doi: 10.1210/en.2012-1045. Epub Apr. 16, 2012.

Mittelman-Smith et al., "Neurokinin 3 receptor-expressing neurons in the median preoptic nucleus modulate heat-dissipation effectors in the female rat", Endocrinology (Jul. 2015); 156(7): 2552-2562. doi: 10.1210/en.2014-1974. Epub Mar. 31, 2015.

Mittelman-Smith et al., "Role for kisspeptin/neurokinin B/dynorphin (KNDy) neurons in cutaneous vasodilatation and the estrogen modulation of body temperature", Proceedings of the National Academy of Sciences (Nov. 2012); 109(48): 19846-19851. doi: 10.1073/pnas.1211517109. Epub Nov. 12, 2012.

Modi et al., "Neurokinin 3 Receptor Antagonism: A Novel Treatment for Menopausal Hot Flushes", Neuroendocrinology. (2019); 109(3): 242-248. doi: 10.1159/000495889. Epub Nov. 30, 2018.

Molnar et al., "Morphological evidence for enhanced kisspeptin and neurokinin B signaling in the infundibular nucleus of the aging man", Endocrinology (Nov. 2012); 153(11): 5428-5439. doi: 10.1210/en.2012-1739. Epub Sep. 25, 2012.

Monti. "Serotonin control of sleep-wake behavior", Sleep Medicine Reviews (Aug. 2011); 15(4): 269-281. doi: 10.1016/j.smrv.2010.11.003. Epub Apr. 2, 2011.

Morrison et al., "Central neural pathways for thermoregulation", Frontiers in Bioscience: A Journal and Virtual Library (Jan. 2011); 16(1): 74-104. doi: 10.2741/3677.

Navarro et al., "Interactions between kisspeptin and neurokinin B in the control of GnRH secretion in the female rat", American Journal of Physiology Endocrinology and Metabolism (2011); 300(1): E202-E210. doi: 10.1152/ajpendo.00517.2010. Epub Nov. 2, 2010.

Navarro et al., "Regulation of gonadotropin-releasing hormone secretion by kisspeptin/dynorphin/neurokinin B neurons in the arcuate nucleus of the mouse", Journal of Neuroscience (Sep. 2009); 29(38): 11859-11866. doi: 10.1523/JNEUROSCI.1569-09.2009.

Navarro et al., "Regulation of NKB pathways and their roles in the control of Kiss 1 Neurons in the arcuate nucleus of the male mouse", Endocrinology (Nov. 2011); 152(11): 4265-4275. doi: 10.1210/en.2011-1143. Epub Sep. 13, 2011.

Navarro et al., "Role of neurokinin B in the control of female puberty and its modulation by metabolic status", The Journal of Neuroscience (Feb. 2012); 32(7): 2388-2397. doi: 10.1523/JNEUROSCI.4288-11.2012.

Navarro et al., "The integrated hypothalamic tachykinin-kisspeptin system as a central coordinator for reproduction", Endocrinology (Feb. 2015); 156(2): 627-637. doi: 10.1210/en.2014-1651. Epub Nov. 25, 2014.

Navarro. "Metabolic regulation of kisspeptin—the link between energy balance and reproduction", Nature Reviews Endocrinology (Aug. 2020); 16(8): 407-420. doi: 10.1038/s41574-020-0363-7. Epub May 19, 2020.

Nestor et al., "Evidence of a role for kisspeptin and neurokinin B in puberty of female sheep", Endocrinology (Jun. 2012); 153(6): 2756-2765. doi: 10.1210/en.2011-2009. Epub Mar. 20, 2012.

Ng. "Chapter 5: Drug Development and Preclinical Studies", Drugs From Discovery to Approval, Second Edition, John Wiley & Sons, Inc. (2009); pp. 136-175.

Ng. "Chapter 6: Clinical Trials", Drugs From Discovery to Approval, Second Edition, John Wiley & Sons, Inc. (2009); pp. 176-207.

Noritake et al., "Involvement of neurokinin receptors in the control of pulsatile luteinizing hormone secretion in rats", Journal of Reproduction and Development (Jun. 2011); 57(3): 409-415. doi: 10.1262/jrd.11-002s. Epub Feb. 25, 2011.

Okamura et al., "Mapping of KNDy neurons and immunohistochemical analysis of the interaction between KNDy and substance P neural systems in goat", Journal of Reproduction and Development (Dec. 2017); 63(6): 571-580. doi: 10.1262/jrd.2017-103. Epub Nov. 7, 2017.

Overgaard et al., "Disparate changes in kisspeptin and neurokinin B expression in the arcuate nucleus after sex steroid manipulation reveal differential regulation of the two KNDy peptides in rats", Endocrinology (Oct. 2014); 155(10): 3945-3955. doi: 10.1210/en.2014-1200. Epub Jul. 22, 2014.

Padilla et al., "A neural circuit underlying the generation of hot flushes", Cell Reports (Jul. 2018); 24(2): 271-277. doi: 10.1016/j.celrep.2018.06.037.

Page et al., "Excessive placental secretion of neurokinin B during the third trimester causes pre-eclampsia", Nature (Jun. 2000); 405(6788): 797-800. doi: 10.1038/35015579.

Page, et al., "Gene regulation of neurokinin B and its receptor NK3 in late pregnancy and pre-eclampsia." MHR: Basic science of reproductive medicine (Jul. 2006); 12(7): 427-433.doi: 10.1093/molehr/gal025. Epub May 18, 2006.

Page. "Neurokinin B and pre-eclampsia: a decade of discovery", Reproductive Biology and Endocrinology (Jan. 2010); 8: 1-9. doi: 10.1186/1477-7827-8-4.

Panocka et al., "Antidepressant-type effect of the NK3 tachykinin receptor agonist aminosenktide in mouse lines differing in endogenous opioid system activity", Peptides (Jul. 2001); 22(7): 1037-1042. doi: 10.1016/s0196-9781(01)00438-7.

Patacchini et al., "Tachykinin NK1 and NK2 receptors mediate inhibitory vs excitatory motor responses in human isolated corpus cavernosum and spongiosum", British Journal of Pharmacology (2002); 135(6): 1351-1354. doi: 10.1038/sj.bjp.0704650.

Patak et al., "Functional and molecular characterization of tachykinins and tachykinin receptors in the mouse uterus", Biology of Repro-

(56) References Cited

OTHER PUBLICATIONS duction (May 2005); 72(5): 1125-1133. doi: 10.1095/biolreprod. 104.036814. Epub Jan. 12, 2005.
Patak et al., "Tachykinins and tachykinin receptors in human uterus", British Journal of Pharmacology (Jun. 2003); 139(3): 523-532. doi: 10.1038/sj.bjp.0705279.
Paul et al., "How to improve R&D productivity: the pharmaceutical industry's grand challenge", Nature Reviews Drug Discovery (Mar. 2010); 9(3): 203-214. doi: 10.1038/nrd3078. Epub Feb. 19, 2010.
Peters et al. "Discovery of potent, balanced and orally active dual NK1/NK3 receptor ligands", Bioorganic & Medicinal Chemistry Letters (Jun. 2010); 20(11): 3405-3408. doi: 10.1016/j.bmcl.2010. 04.008. Epub Apr. 9, 2010.
Pinkerton et al., "Elinzanetant for the Treatment of Vasomotor Symptoms Associated With Menopause: OASIS 1 and 2 Randomized Clinical Trials", JAMA (Aug. 2024); 332(16): 1343-1354. doi: 10.1001/jama.2024.14618.
Pinkerton et al., "Phase 3 randomized controlled study of gastroretentive gabapentin for the treatment of moderate-to-severe hot flashes in menopause", Menopause (Jun. 2014) | 21(6): 567-573. doi: 10.1097/GME.0b013e3182a7c073.
Pinkerton et al., "Relief of vasomotor symptoms with the tissue-selective estrogen complex containing bazedoxifene/conjugated estrogens: a randomized, controlled trial", Menopause (Nov.-Dec. 2009); 16(6): 1116-1124. doi: 10.1097/gme.0b013e3181a7df0d.
Pintado et al., "A role for tachykinins in female mouse and rat reproductive function", Biology of Reproduction (Sep. 2003); 69(3): 940-946. doi: 10.1095/biolreprod.103.017111. Epub May 28, 2003.
Pinto et al., "Ovarian steroids regulate tachykinin and tachykinin receptor gene expression in the mouse uterus", Reproductive Biology and Endocrinology (Jul. 2009); 7(77): 1-11. doi: 10.1186/1477-7827-7-77.
Porter et al., "Neurokinin-3 receptor activation in the retrochiasmatic area is essential for the full pre-ovulatory luteinising hormone surge in ewes", Journal of neuroendocrinology (Nov. 2014); 26(11): 776-784. doi: 10.1111/jne.12180.
Prague et al., "Neurokinin 3 receptor antagonism as a novel treatment for menopausal hot flushes: a phase 2, randomised, double-blind, placebo-controlled trial", The Lancet (May 2017); 389(10081): 1809-1820. doi: 10.1016/S0140-6736(17)30823-1. Epub Apr. 3, 2017.
Prague et al., "Neurokinin 3 receptor antagonism rapidly improves vasomotor symptoms with sustained duration of action", Menopause (Aug. 2018); 25(8): 862-869. doi: 10.1097/GME. 0000000000001090.
Ramalho et al., "Substance P antagonist improves both obesity and asthma in a mouse model", Allergy (Jan. 2013); 68(1): 48-54. doi: 10.1111/all.12052. Epub Nov. 26, 2012.
Ramaswamy et al., "Neurokinin B stimulates GnRH release in the male monkey (*Macaca mulatta*) and is colocalized with kisspeptin in the arcuate nucleus", Endocrinology (Sep. 2010); 151(9): 4494-4503. doi: 10.1210/en.2010-0223. Epub Jun. 23, 2010.
Rameshwar et al., "Hematopoietic modulation by the tachykinins", Acta Haematologica (1997); 98(2): 59-64. doi: 10.1159/000203593.
Rance et al., "Hypertrophy and increased gene expression of neurons containing neurokinin-B and substance-P messenger ribonucleic acids in the hypothalamicf postmenopausal women", Endocrinology (May 1991); 128(5): 2239-2247. doi: 10.1210/endo-128-5-2239.
Rance et al., "Modulation of body temperature and LH secretion by hypothalamic KNDy (kisspeptin, neurokinin B and dynorphin) neurons: a novel hypothesis on the mechanism of hot flushes", Frontiers in Neuroendocrinology (Aug. 2013); 34(3): 211-227. doi: 10.1016/j.yfrne.2013.07.003. Epub Jul. 17, 2013.
Rance et al., "Neurokinin B and the hypothalamic regulation of reproduction", Brain Research (Dec. 2010); 1364: 116-128. doi: 10.1016/j.brainres.2010.08.059. Epub Aug. 25, 2010.
Rance et al., "Postmenopausal hypertrophy of neurons expressing the estrogen receptor gene in the human hypothalamus", The Journal of Clinical Endocrinology & Metabolism (Jul. 1990); 71(1): 79-85. doi: 10.1210/jcem-71-1-79.
Rance. "Menopause and the human hypothalamus: evidence for the role of kisspeptin/neurokinin B neurons in the regulation of estrogen negative feedback", Peptides (Jan. 2009; 30(1): 111-22. doi: 10.1016/j.peptides.2008.05.016. Epub May 28, 2008.
Ratti et al., "Efficacy of vestipitant, a neurokinin-1 receptor antagonist, in primary insomnia", Sleep (Dec. 2013); 36(12): 1823-30. doi: 10.5665/sleep.3208.
Ratti et al., "Results from 2 randomized, double-blind, placebo-controlled studies of the novel NK1 receptor antagonist casopitant in patients with major depressive disorder", Journal of Clinical Psychopharmacology (Dec. 2011); 31(6): 727-33. doi: 10.1097/JCP. 0b013e31823608ca. Erratum in: J Clin Psychopharmacol. Apr. 2012;32(2):185.
Regoli et al., "Neuropeptides (Neurokinins, Bombesin, Neurotensin, Cholecystokinins, Opioids) and Smooth Muscle", in Pharmacology of Smooth Muscle, Szekeres & Papp (ed.), Springer-Verlag, Heidelberg, Chapter 8 (1994); 257-258.
Renner, et al., "Neurokinin 1 receptor gene polymorphism might be correlated with recurrence rates in endometriosis", Gynecological Endocrinology (Nov. 2009); 25(11): 726-733. doi: 10.3109/09513590903159631.
Ribeiro et al., "Tachykinin NK(3)receptor involvement in anxiety", Neuropeptides (Apr. 1999); 33(2):181-188. doi: 10.1054/npep.1999. 0021.
Ridler et al., "Characterising the plasma-target occupancy relationship of the neurokinin antagonist GSK1144814 with PET", Journal of Psychopharmacology (Mar. 2014); 28(3): 244-53. doi: 10.1177/0269881113517953. Epub Jan. 15, 2014. PMID: 24429221.
Rometo et al., "Changes in prodynorphin gene expression and neuronal morphology in the hypothalamus of postmenopausal women", Journal of Neuroendocrinology (Dec. 2008); 20(12): 1376-81. doi: 10.1111/j.1365-2826.2008.01796.x.
Rotterdam Eshre/ASRM-Sponsored PCOS Consensus Workshop Group. "Revised 2003 consensus on diagnostic criteria and long-term health risks related to polycystic ovary syndrome", Fertility and Sterility (Jan. 2004); 81(1): 19- 25. doi: 10.1016/j.fertnstert. 2003.10.004.
Ruiz-Pino et al., "Neurokinin B and the control of the gonadotropic axis in the rat: developmental changes, sexual dimorphism, and regulation by gonadal steroids", Endocrinology (Oct. 2012); 153(10): 4818-4829. doi: 10.1210/en.2012-1287. Epub Jul. 20, 2012.
Ruka et al., "Regulation of arcuate neurons coexpressing kisspeptin, neurokinin B, and dynorphin by modulators of neurokinin 3 and κ-opioid receptors in adult male mice", Endocrinology (Aug. 2013); 154(8): 2761-2771. doi: 10.1210/en.2013-1268. Epub Jun. 6, 2013.
Rumsey et al., "Combined Tachykinin NK1, NK2, and NK3 Receptor Antagonists", in Tachykinins, Holzer (ed.), SpringerVerlag, Heidelberg (2004); pp. 273-296.
Sandoval-Guzman et al., "Effects of ovariectomy on the neuroendocrine axes regulating reproduction and energy balance in young cynomolgus macaques", Journal of Neuroendocrinology (Feb. 2004); 16(2): 146-153. doi: 10.1111/j.0953-8194.2004.01143.x.
Savoie et al., "Involvement of NK1 and NK2 receptors in pulmonary responses elicited by non-adrenergic, non-cholinergic vagal stimulation in guinea-pigs", Journal of Pharmacy and Pharmacology (Nov. 1995); 47(11): 914-920. doi: 10.1111/j.2042-7158.1995. tb03270.x.
Scholzen et al., "Cutaneous allergic contact dermatitis responses are diminished in mice deficient in neurokinin 1 receptors and augmented by neurokinin 2 receptor blockage", The FASEB Journal (Jun. 2004); 18(9): 1007-1009. doi: 10.1096/fj.03-0658fje. Epub Apr. 14, 2004.
Schulz et al., "Mass Balance Recovery, Absorption, Metabolism, and Excretion of Elinzanetant in Healthy Human Volunteers and in vitro Biotransformation", European Journal of Drug Metabolism and Pharmacokinetics (Jan. 2025); 50(1): 91-103. doi: 10.1007/s13318-024-00930-3. Epub Dec. 24, 2024.
Schwarz et al., "The role of substance P in depression: therapeutic implications", Dialogues in Clinical Neuroscience (Mar. 2002); 4(1): 21-29. doi: 10.31887/DCNS.2002.4.1/mschwarz.

(56) References Cited

OTHER PUBLICATIONS

Semple et al., "The recent genetics of hypogonadotrophic hypogonadism—novel insights and new questions insights and new questions", Clinical Endocrinology (2010); 72(4): 427-435. doi: 10.1111/j.1365-2265.2009.03687.x. Epub Aug. 29, 2009.

Siegel. "The neurotransmitters of sleep", The Journal of Clinical Psychiatry (2004); 65(Suppl 16): 4-7.

Simon et al., "Low-dose paroxetine 7.5 mg for menopausal vasomotor symptoms: Two randomized controlled trials", Menopause: The Journal of The North American Menopause Society (Oct. 2013); 20(10): 1027-1035. doi: 10.1097/GME.0b013e3182a66aa7.

Skorupskaite et al., "Neurokinin 3 Receptor Antagonism Reveals Roles for Neurokinin B in the Regulation of Gonadotropin Secretion and Hot Flashes in Postmenopausal Women", Neuroendocrinology (2018); 106(2): 148-157. doi: 10.1159/000473893. Epub Apr. 5, 2017.

Skorupskaite et al., "Role of a neurokinin B receptor antagonist in the regulation of ovarian function in healthy women", Poster Abstract, Poster 83, The Lancet (Feb. 26, 2015); p. 92.

Skorupskaite et al., "The kisspeptin-GnRH pathway in human reproductive health and disease", Human Reproduction Update (Jul.-Aug. 2014); 20(4): 485-500. doi: 10.1093/humupd/dmu009. Epub Mar. 9, 2014.

Skrapits et al., "Neuropeptide Co-Expression in Hypothalamic Kisspeptin Neurons of Laboratory Animals and the Human", Frontiers in Neuroscience (Feb. 2015); 9(29): 1-9. doi: 10.3389/fnins.2015.00029.

Sloan et al., "Methodologic Lessons Learned From Hot Flash Studies", Journal of Clinical Oncology (Dec. 2001); 19(23): 4280-4290. doi: 10.1200/JCO.2001.19.23.4280.

Soares et al., "Reproductive hormone sensitivity and risk for depression across the female life cycle: a continuum of vulnerability?", Journal of Psychiatry and Neuroscience (Jul. 2008); 33(4): 331-343.

Stevenson et al., "Oral Ultra-low Dose Continuous Combined Hormone Replacement Therapy with 0.5 mg 17?-oestradiol and 2.5 mg Dydrogesterone for the Treatment of Vasomotor Symptoms: Results from a Double-blind, Placebo-controlled Study", Maturitas (Nov. 2010); 67(3): 227-232. doi: 10.1016/j.maturitas.2010.07.002. Epub Aug. 4, 2010.

Stratton et al., "Anxiolytic activity of tachykinin NK2 receptor antagonists in the mouse light-dark box," European Journal of Pharmacology (Dec. 1993); 250(3): R11-R12. doi: 10.1016/0014-2999(93)90042-g.

Streuli et al., "An update on the pharmacological management of adenomyosis", Expert Opinion on Pharmacotherapy (Nov. 2014) 15(16): 2347-2360. doi: 10.1517/14656566.2014.953055. Epub Sep. 6, 2014.

Struthers et al., "Suppression of gonadotropins and estradiol in premenopausal women by oral administration of the nonpeptide gonadotropin-releasing hormone antagonist elagolix", The Journal of Clinical Endocrinology & Metabolism (Feb. 2009); 94(2): 545-551. doi: 10.1210/jc.2008-1695. Epub Nov. 25, 2008.

Sun et al., "Observation on the Efficacy of Testosterone Undecanoate Capsules Combined with Psychological Intervention in the Treatment of Partial Androgen Deficiency Syndrome in Middle-aged and Elderly Men", Modern Journal of Integrated Traditional Chinese and Western Medicine (May 2013); 22(15); 1673-1675; 11 total pages with English Translation.

Tataryn et al., "LH, FSH and skin temperature during the menopausal hot flash", The Journal of Clinical Endocrinology & Metabolism (Jul. 1979); 49(1): 152-154. doi: 10.1210/jcem-49-1-152.

Taziaux et al., "Sex differences in the neurokinin B system in the human infundibular nucleus", The Journal of Clinical Endocrinology & Metabolism (Dec. 2012); 97(12): E2210-E2220. doi: 10.1210/jc.2012-1554. Epub Sep. 27, 2012.

Te Beek et al., "Pharmacokinetics and central nervous system effects of the novel dual NK1/NK3 receptor antagonist GSK1144814 in alcohol-intoxicated volunteers", British Journal of Clinical Pharmacology (May 2013); 75(5): 1328-1339. doi: 10.1111/bcp.12004.

Teixeira et al., "Effects of central administration of tachykinin receptor agonists and antagonists on plus-maze behavior in mice", European Journal of Pharmacology (Sep. 1996); 311(1): 7-14. doi: 10.1016/0014-2999(96)00390-1.

Topaloglu et al., "TAC3 and TACR3 mutations in familial hypogonadotropic hypogonadism reveal a key role for Neurokinin B in the central control of reproduction", Nature Genetics (Mar. 2009); 41(3): 354-358. doi: 10.1038/ng.306. Epub Dec. 11, 2008.

Trist et al., "Why receptor reserve matters for neurokinin1 (NK1) receptor antagonists", Journal of Receptors and Signal Transduction (Dec. 2013); 33(6): 333-337. doi: 10.3109/10799893.2013.843194. Epub Oct. 9, 2013. PMID: 24106886.

Trower et al., "P-58. Evidence for rapid and sustained target engagement by a dual mechanism neurokinin-3,1 receptor antagonist on hypothalamic KNDy neurons; results from Phase 1 studies with NT-814, a potential novel therapy for sex hormone-dependent diseases", Kisspeptin Meeting, Abstract (2017); 1 total page.

Varotha et al., "Androgenetic Alopecia: An Evidence-Based Treatment Update", American Journal of Clinical Dermatology (Jul. 2014); 15(3): 217-230. doi: 10.1007/s40257-014-0077-5.

Vijayan et al., "In Vivo and In Vitro effects of substance P and neurotensin on gonadotropin and prolactin release", Endocrinology (Jul. 1979); 105(1): 64-68. doi: 10.1210/endo-105-1-64.

Vila. "Pharmaceutical Technology", Solid Oral Forms, Pharmaceutical Forms. Ed. Síntesis S.A. (1999); Chapter 2: 55-155; 202 total pages with English Translation.

Wakabayashi et al., "Neurokinin B and dynorphin A in kisspeptin neurons of the arcuate nucleus participate in generation of periodic oscillation of neural activity driving pulsatile gonadotropin-releasing hormone secretion in the goat", Journal of Neuroscience (Feb. 2010); 30(8): 3124-3132. doi: 10.1523/JNEUROSCI.5848-09.2010.

Weems et al., "The Roles of Neurokinins and Endogenous Opioid Peptides in Control of Pulsatile LH Secretion", Vitamins and Hormones (2018); 107: 89-135. doi: 10.1016/bs.vh.2018.01.011. Epub Feb. 13, 2018.

Wong et al., "Neurokinin-1 receptor desensitization attenuates cutaneous active vasodilatation in humans", The Journal of physiology (Dec. 2006); 577(Pt 3): 1043-1051. doi: 10.1113/jphysiol.2006.112508. Epub Oct. 5, 2006.

Yamamura et al., "Effects of intravenous administration of neurokinin receptor subtype-selective agonists on gonadotropin-releasing hormone pulse generator activity and luteinizing hormone secretion in goats", Journal of Reproduction and Development (2015); 61(1): 20-29. doi: 10.1262/jrd.2014-109. Epub Oct. 27, 2014.

Yang et al., "Uncovering novel reproductive defects in neurokinin B receptor null mice: closing the gap between mice and men", Endocrinology (Mar. 2012); 153(3): 1498-1508. doi: 10.1210/en.2011-1949. Epub Jan. 17, 2012.

Young et al., "TAC3 and TACR3 defects cause hypothalamic congenital hypogonadotropic hypogonadism in humans", The Journal of Clinical Endocrinology & Metabolism (May 2010); 95(5): 2287-2295. doi: 10.1210/jc.2009-2600. Epub Mar. 1, 2010.

\* cited by examiner

METHODS OF TREATMENT WITH ELINZANETANT

BACKGROUND

Women experience a range of symptoms during menopause, including vasomotor symptoms (VMS), commonly known as hot flashes and night sweats and are associated with sleep disturbances, affecting up to 80% and 60% of women, respectively. These symptoms can significantly impact quality of life by disrupting daily activities and work productivity. Additionally, these menopause symptoms may contribute to long-term health risks such as cardiovascular disease, depression, cognitive decline, and other adverse neurological and psychological outcomes.

Research studies have identified that hypothalamic kisspeptin/neurokinin/dynorphin (KNDy) neurons play a role in thermoregulation. The KNDy neurons express several receptor/ligand systems, including NK-1 and NK-3 receptors and their respective ligands, substance P (SP) and neurokinin B (NKB). As estrogen levels decline during and after menopause, KNDy neurons become hypertrophic and hyperactive, leading to increased expression of NKB and SP. Such hyperactivation disrupts thermoregulation and is believed to trigger VMS.

Safe and effective treatment regimens are needed for women with VMS. This disclosure addresses this and other needs.

SUMMARY

The details and embodiments of the present invention are defined by the disclosure herein. When referring to method of treatment comprising the administration of elinzanetant or stereoisomer thereof, or an equivalent dose of a pharmaceutically acceptable salt thereof, the subject-matter also includes elinzanetant or stereoisomer thereof, or an equivalent dose of a pharmaceutically acceptable salt thereof for use in the respective treatment in any embodiment and definition as set out herein. The present disclosure provides for methods of treating vasomotor symptoms or sleep disturbances in a female subject by administering a CYP3A4 substrate drug, wherein the subject is undergoing concomitant treatment with a CYP3A4 inhibitor. In embodiments, the present disclosure provides a method of treating vasomotor symptoms in a female subject in need thereof, comprising administering about 25% to about 75% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor. In particular, the present disclosure provides methods of treating vasomotor symptoms in a female subject in need thereof, comprising administering about 25 mg to about 100 mg of elinzanetant or stereoisomer thereof, or an equivalent dose of a pharmaceutically acceptable salt thereof, wherein the female subject is undergoing concomitant treatment with a moderate CYP3A4 inhibitor.

In embodiments, the present disclosure provides a method of treating vasomotor symptoms in a female subject in need thereof, comprising administering about 25% to about 75% of a reference dose of elinzanetant or stereoisomer thereof, or an equivalent dose of a pharmaceutically acceptable salt thereof, wherein the female subject is undergoing concomitant treatment with a moderate CYP3A4 inhibitor; and wherein the reference dose of elinzanetant is a daily dose of about 100 mg to about 160 mg. In embodiments, the reference dose of elinzanetant is a daily dose of about 120 mg. In embodiments, the method comprises administering 50% of the reference dose of elinzanetant. In embodiments, about 30 mg of elinzanetant is administered once a day. In embodiments, about 60 mg of elinzanetant is administered once a day. In embodiments, about 90 mg of elinzanetant is administered once a day.

In embodiments, the method further comprises treating sleep disturbances associated with menopause. In embodiments, elinzanetant is administered once a day. In embodiments, elinzanetant is administered at bedtime (h.s.). In embodiments, the female subject has moderate to severe vasomotor symptoms prior to administering elinzanetant. In embodiments, the female subject is an adult. In embodiments, the female subject is 40-65 years old. In embodiments, the female subject is menopausal. In embodiments, the female subject is post-menopausal. In embodiments, prior to administering elinzanetant, the female subject experienced: (i) at least 12 months of spontaneous amenorrhea; (ii) at least 6 months of spontaneous amenorrhea with serum follicle-stimulating hormone (FSH) levels>40 mIU/mL and a serum estradiol concentration of <30 pg/mL; (iii) hysterectomy with serum FSH levels>40 mIU/mL and a serum estradiol concentration of <30 pg/mL; or (iv) surgical bilateral oophorectomy with or without hysterectomy. In embodiments, the vasomotor symptoms are caused by adjuvant endocrine therapy. In embodiments, the vasomotor symptoms are associated with menopause. In embodiments, the moderate CYP3A4 inhibitor comprises amiodarone, aprepitant, ciprofloxacin, clarithromycin, conivaptan, crizotinib, cyclosporine, diltiazem, dronedarone, erythromycin, fluconazole, grapefruit juice, imatinib, isavuconazole, or verapamil. In embodiments, the moderate CYP3A4 inhibitor is selected from the group consisting of amiodarone, aprepitant, ciprofloxacin, clarithromycin, conivaptan, crizotinib, cyclosporine, diltiazem, dronedarone, erythromycin, fluconazole, grapefruit juice, imatinib, isavuconazole, and verapamil.

In embodiments, the method comprises reducing the frequency of the vasomotor symptoms compared to baseline. In embodiments, the method comprises reducing the severity of the vasomotor symptoms compared to baseline. In embodiments, the method comprises reducing the frequency of moderate to severe hot flash (HF) from baseline. In embodiments, the method comprises improving the symptoms determined by a decrease in patient-reported outcomes measurement information system sleep disturbance short form 8b (PROMIS SD SF 8b) total T-score from baseline. In embodiments, the method comprises improving the symptoms determined by a decrease in menopause specific quality of life scale (MENQOL) total score from baseline. In embodiments, the method comprises improving the symptoms determined by a decrease in Beck depression inventory (BDI-II) total score from baseline.

In embodiments, the present disclosure provides a method of treating vasomotor symptoms and/or sleep disturbances in a female subject in need thereof, comprising administering about 25 mg to about 100 mg of elinzanetant or stereoisomer thereof, or an equivalent dose of a pharmaceutically acceptable salt or deuterated form thereof, wherein the female subject is undergoing concomitant treatment with a moderate CYP3A4 inhibitor.

In embodiments, the present disclosure provides a method of treating vasomotor symptoms and/or sleep disturbances in a female subject in need thereof, comprising administering about 25% to about 75% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor; and wherein the reference dose of elinzanetant is about 100 mg to about 160 mg.

In embodiments, the present disclosure provides a method of treating vasomotor symptoms with elinzanetant in a female subject in need thereof, comprising recommending to avoid using a strong CYP3A4 inhibitor with elinzanetant. In embodiments, the present disclosure provides a method of treating vasomotor symptoms in a female subject in need thereof with elinzanetant or stereoisomer thereof, or an equivalent dose of a pharmaceutically acceptable salt or deuterated form thereof, wherein concomitant use of the strong CYP3A4 inhibitor with elinzanetant is not recommended. In embodiments, the concomitant use of elinzanetant and the strong CYP3A4 inhibitor is contraindicated. In further embodiments, the female subject discontinues the strong CYP3A4 inhibitor treatment, and then administers a reference dose of elinzanetant. In embodiments, the female subject discontinues elinzanetant treatment, and then administers the strong CYP3A4 inhibitor.

DETAILED DESCRIPTION

Figure 1:
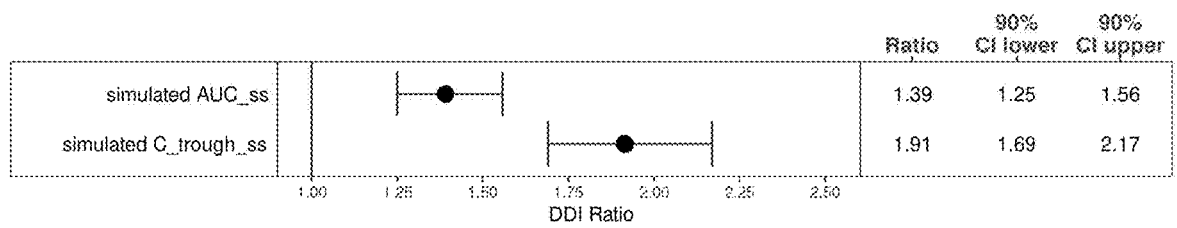
FIG. 1 illustrates the geometric mean ratio (90% CI) of steady state AUC and $C_{trough}$ following concomitant administration of 60 mg elinzanetant with a moderate CYP3A4 inhibitor, erythromycin, compared to 120 mg elinzanetant alone, as described in Example 2.

All publications, patents and patent applications, including any drawings and appendices therein are incorporated by reference in their entirety for all purposes to the same extent as if each individual publication, patent or patent application, drawing, or appendix was specifically and individually indicated to be incorporated by reference in its entirety for all purposes.

Definitions

While the following terms are believed to be well understood by one of ordinary skill in the art, the following definitions are set forth to facilitate explanation of the presently disclosed subject matter.

As used in the specification and claims, the singular form "a", "an" and "the" includes plural references unless the context clearly dictates otherwise.

Elinzanetant is also known as 2-[3,5-bis(trifluoromethyl)phenyl]-N-{4-(4-fluoro-2-methylphenyl)-6-[(7S,9aS)-7-(hydroxymethyl) hexahydropyrazino[2,1c]oxazin-8 (1H)-yl]pyridin-3-yl}-N,2-dimethylpropanamide, and has the structure below.

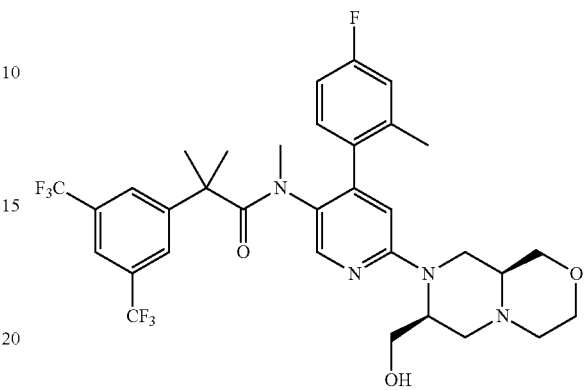

All references to elinzanetant described herein also encompass all of its pharmaceutically acceptable solvates, hydrates, polymorphs, stereoisomers, salts, and prodrugs (e.g., esters and phosphates).

As used herein, the term "about" refers to an acceptable amount of variability in the art. For example, "about" may encompass plus or minus five or ten percent of the object that "about" modifies. The term "about" also includes the value referenced. For example, a dose of about 1 mg includes 1 mg, as well as values somewhat below or above 1, such as 0.9 mg and 1.1 mg. As used herein, "and/or" refers to and encompasses any and all possible combinations of the associated listed items, as well as the lack of combinations when interpreted in the alternative ("or").

As used herein, the terms "treating," "treatment" and "treat" refer to safely and effectively reducing (to a clinically relevant extent) or eliminating vasomotor symptoms or sleep disturbances. In the context of the present disclosure, the disclosed dosing regimens do not present an unacceptable risk of serious side effects that would otherwise occur when a female subject receiving treatment with a moderate CYP3A4 inhibitor is also treated with the reference dose of elinzanetant.

"Concomitant treatment" as used herein refers to a situation in which a female subject is treated with a CYP3A4 inhibitor and elinzanetant within a 24 hour period. Thus, "concomitant" encompasses situations in which the CYP3A4 inhibitor and elinzanetant are administered at the same time, sequentially, or within 12 hours of each other. As used herein, "concomitant" is synonymous with "concurrent" and "coadminister", and variants thereof, and may be used herein interchangeably.

"Vasomotor symptoms" are also known as "hot flashes" or "hot flushes". The vasomotor symptoms are also referred to as "night sweats" when occurring at night or during sleep. The term "vasomotor symptoms" as used herein includes mild, moderate and severe vasomotor symptoms.

"Sleep disturbances" include night-time awakenings, Wake After Sleep Onset (WASO), difficulty falling asleep, and difficulty staying asleep.

In embodiments, the patient is administered elinzanetant or stereoisomer thereof, or an equivalent dose of a pharmaceutically acceptable salt or deuterated form thereof, at a dose that would provide a favorable risk/benefit profile. The risk/benefit profile weighs the patient's risk(s) of potential adverse event(s) if treated compared to the benefit(s) of treatment. Non-limiting examples of factors used to assess the risk/benefit profile include: (i) the type of benefit(s) the patient would receive (e.g., treatment end points and the value of treatment to the patient); (ii) magnitude of the benefit(s); (iii) probability of the patient experiencing one or more benefit(s); (iv) duration of effect(s) and whether the duration is a benefit; (v) severity, types, number, and rates of harmful events (e.g., serious vs. non-serious adverse events); (vi) probability of a harmful event (e.g., the percentage of the patient population that would be expected to experience a harmful event; the incidence of each harmful event in the study population; degree of uncertainty in determination probability; patient's willingness to accept the probable risk of the harmful event, given the probable benefit); (vii) duration of harmful events (e.g., how long does the harmful event last and is it reversible; types of intervention required to address the harmful event); and/or (viii) medical necessity (e.g., does the elinzanetant provide a benefit or address a need unmet by other therapies). In the context of a potential drug-drug interaction between a CYP3A4 inhibitor and elinzanetant, appropriate dosing of elinzanetant in the presence of a CYP3A4 inhibitor requires balancing the various risk and benefit factors (e.g., as described above). In embodiments, the female subject is administered a reduced dose if the benefit(s) outweigh the risk(s).

As used herein, the terms "patient" and "subject" are synonymous and used interchangeably.

As used herein, a "pharmaceutically acceptable salt" refers to those salts which are, within the scope of sound medical judgment, suitable for use in contact with the tissues of subjects without undue toxicity, irritation, allergic response and the like, and are commensurate with a reasonable benefit/risk ratio. Pharmaceutically acceptable salts are well known in the art. For example, Berge et al. describes pharmaceutically acceptable salts in detail in J Pharmaceutical Sciences (1977) 66:1-19. Pharmaceutically acceptable salts of the compounds provided herein include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, besylate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. In embodiments, organic acids from which salts may be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like.

Pharmaceutically acceptable salts derived from appropriate bases include alkali metal, alkaline earth metal, ammonium and $N(C_{1-4}\,alkyl)_4$ salts. Representative alkali or alkaline earth metal salts include sodium, lithium, potassium, calcium, magnesium, iron, zinc, copper, manganese, aluminum, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate, and aryl sulfonate. Organic bases from which salts may be derived include, for example, primary, secondary, and tertiary amines, substituted amines including naturally occurring substituted amines, cyclic amines, basic ion exchange resins, and the like, such as isopropylamine, trimethylamine, diethylamine, triethylamine, tripropylamine, and ethanolamine. In embodiments, the pharmaceutically acceptable base addition salt is chosen from ammonium, potassium, sodium, calcium, and magnesium salt.

As used herein, "equivalent dose" refers to an amount of a pharmaceutically acceptable salt or deuterated form of elinzanetant that contains the same number of moles of free base elinzanetant.

As used herein, a "reference dose" refers to the dosage of elinzanetant used to treat an identical subject who is not undergoing concomitant treatment with a CYP3A4 inhibitor, such as with a strong or moderate CYP3A4 inhibitor.

As used herein, a "strong CYP3A4 inhibitor" or a "moderate CYP3A4 inhibitor" refers to a drug deemed so by the FDA. For example, a strong CYP3A4 inhibitor may include a drug that causes at least about a 5-fold increase in the AUC of a sensitive CYP3A4 substrate drug, or more than about an 80% decrease in the clearance of a sensitive CYP3A4 substrate drug. A moderate CYP3A4 inhibitor may include a drug that increase the AUC of sensitive index substrates of CYP3A4 greater than or equal to 2-fold to less than 5-fold.

Methods of the Present Disclosure

The present disclosure provides a method of treating vasomotor symptoms and/or sleep disturbances in female subjects comprising administering elinzanetant or stereoisomer thereof, or an equivalent dose of a pharmaceutically acceptable salt or deuterated form thereof, in a female subject who is undergoing concomitant treatment with a CYP3A4 inhibitor. In embodiments, vasomotor symptoms are vasomotor symptoms associated with menopause. In embodiments, vasomotor symptoms are vasomotor symptoms caused or induced by adjuvant endocrine therapy, such as adjuvant endocrine therapy in breast cancer patients.

Elinzanetant is a nonhormonal therapy currently in clinical development and pre-registration with the FDA for the treatment of mild to severe vasomotor symptoms associated with menopause. Elinzanetant functions as a dual NK-1/NK-3 antagonist, specifically targeting both receptors. Once administered, elinzanetant is primarily metabolized by the CYP3A4 enzyme, which plays a key role in oxidizing small organic molecules, including drugs and toxins, to facilitate their degradation. Drugs that are primarily metabolized by the CYP3A4 enzyme are classified as "CYP3A4 substrate drugs".

CYP3A4 inhibitors block the enzyme responsible for metabolizing the substrate drug (here, elinzanetant). As a result, the blood levels of elinzanetant may rise significantly, increasing the risk of serious adverse effects due to drug toxicity. Prior to the present disclosure, the co-administration of elinzanetant with CYP3A4 enzyme inhibitors has not been studied and therefore it was unknown how to safely and effectively co-administer elinzanetant with CYP3A4 inhibitors, such as strong inhibitors and moderate inhibitors. No established guidelines for patients who require both elinzanetant and CYP3A4 inhibitor treatment is available in the art. There is a need in the art to predict, manage, and to provide dosage adjustment to ensure safe use of elinzanetant in this patient population.

Applicant conducted the first drug-drug interaction studies with elinzanetant and strong and moderate CYP3A4 inhibitors. The effect of a strong or moderate CYP3A4 inhibitor on a CYP3A4 substrate, like elinzanetant, is unpredictable and must be determined empirically. As discussed herein, based on applicant's studies, it was determined that strong CYP3A4 inhibitors significantly increased blood plasma concentrations of elinzanetant (following administration of 120 mg) and presented an unacceptable risk of serious side effects to female subjects.

Applicant also discovered that moderate CYP3A4 inhibitors significantly increased blood plasma concentrations of elinzanetant (following administration of 120 mg) and presented an unacceptable risk of serious side effects to subjects. However, Applicant surprisingly discovered that elinzanetant can be safely co-administered with a moderate CYP3A4 inhibitor through a specific dose adjustment described in the present disclosure, balancing the various risk and benefit factors. Specifically, Applicant unexpectedly discovered that the treatment methods described herein achieve elinzanetant blood plasma concentration levels below toxic levels while still providing therapeutic efficacy in treating vasomotor symptoms.

In embodiments, the present disclosure provides a method of treating vasomotor symptoms in a female subject in need thereof, comprising administering elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, the present disclosure provides a method of treating vasomotor symptoms and/or sleep disturbances in a female subject in need thereof, comprising administering elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, the method comprises treating sleep disturbances that are associated with menopause. In embodiments, the sleep disturbances are caused by having vasomotor symptoms.

In embodiments, the present disclosure provides a method of treating vasomotor symptoms in a female subject comprising administering about 20 mg to about 100 mg of elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, elinzanetant is administered at a dose of about 20 mg to about 100 mg, about 25 mg to about 100 mg, about 30 mg to about 100 mg, about 40 mg to about 100 mg, about 50 mg to about 100 mg, about 30 mg to about 90 mg, about 40 mg to about 90 mg, about 50 mg to about 90 mg, about 50 mg to about 70 mg, about 55 mg to about 65 mg, about 20 mg, about 25 mg, about 30 mg, about 35 mg, about 40 mg, about 45 mg, about 50 mg, about 55 mg, about 60 mg, about 65 mg, about 70 mg, about 75 mg, about 80 mg, about 85 mg, about 90 mg, about 95 mg, about 100 mg, or any values or ranges therebetween. In embodiments, elinzanetant is administered to the female subject at a dose of about 60 mg.

In embodiments, about 30 mg of elinzanetant or stereoisomer thereof, or an equivalent dose of a pharmaceutically acceptable salt or deuterated form thereof is administered. In embodiments, about 60 mg of elinzanetant or stereoisomer thereof, or an equivalent dose of a pharmaceutically acceptable salt or deuterated form thereof is administered. In embodiments, about 90 mg of elinzanetant or stereoisomer thereof, or an equivalent dose of a pharmaceutically acceptable salt or deuterated form thereof is administered.

In embodiments, the present disclosure provides a method of treating vasomotor symptoms in a female subject comprising administering about 20% to about 80% (e.g., about 25% to about 75%, about 30% to about 80%, about 35% to about 65%, about 40% to about 60%, about 20%, about 25%, about 30%, about 35%, about 40%, about 45%, about 50%, about 55%, about 60%, about 65%, about 70%, about 75%, about 80%, or any values or ranges therebetween) of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, the reference dose of elinzanetant is between 100 mg and 160 mg, between 100 mg and 140 mg, between 100 mg and 130 mg, such as about 100 mg, 110 mg, 120 mg, 130 mg, 140 mg, 150 mg, or 160 mg. In some embodiments the reference dose of elinzanetant is 100 mg, 110 mg, or 120 mg. In some embodiments the reference dose of elinzanetant is 120 mg.

In embodiments, the present disclosure provides a method of treating vasomotor symptoms in a female subject comprising administering about 25% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor, and wherein the reference dose of elinzanetant is about 100 mg. In embodiments, the present disclosure provides a method of treating vasomotor symptoms in a female subject comprising administering about 25% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor, and wherein the reference dose of elinzanetant is about 110 mg. In embodiments, the present disclosure provides a method of treating vasomotor symptoms in a female subject comprising administering about 25% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor, and wherein the reference dose of elinzanetant is about 120 mg.

In embodiments, the present disclosure provides a method of treating vasomotor symptoms in a female subject comprising administering about 50% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor, and wherein the reference dose of elinzanetant is about 120 mg. In embodiments, the present disclosure provides a method of treating vasomotor symptoms in a female subject comprising administering about 75% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor, and wherein the reference dose of elinzanetant is about 120 mg.

In embodiments, 50% of a reference dose of elinzanetant or stereoisomer thereof, or an equivalent dose of a pharmaceutically acceptable salt or deuterated form thereof, is concurrently administered with a moderate CYP3A4 inhibitor, and wherein the reference dose of elinzanetant is about 100 mg. In embodiments, 50% of a reference dose of elinzanetant or stereoisomer thereof, or an equivalent dose of a pharmaceutically acceptable salt or deuterated form thereof, is concurrently administered with a moderate CYP3A4 inhibitor, and wherein the reference dose of elinzanetant is about 110 mg. In embodiments, 50% of a reference dose of elinzanetant or stereoisomer thereof, or an equivalent dose of a pharmaceutically acceptable salt or deuterated form thereof, is concurrently administered with a moderate CYP3A4 inhibitor, and wherein the reference dose of elinzanetant is about 120 mg.

In embodiments, elinzanetant or stereoisomer thereof, or an equivalent dose of a pharmaceutically acceptable salt or deuterated form thereof, is administered once daily. In embodiments, elinzanetant or stereoisomer thereof, or an equivalent dose of a pharmaceutically acceptable salt or deuterated form thereof, is administered at bedtime (h.s.). In embodiments, elinzanetant or stereoisomer thereof, or an equivalent dose of a pharmaceutically acceptable salt or deuterated form thereof, is administered in the evening. In embodiments, elinzanetant or stereoisomer thereof, or an equivalent dose of a pharmaceutically acceptable salt or deuterated form thereof, is administered once daily at bedtime (h.s.) or in the evening.

In embodiments, about 25 mg to about 100 mg elinzanetant or stereoisomer thereof, or an equivalent dose of a pharmaceutically acceptable salt or deuterated form thereof, is administered once a day (i.e., a total daily dose of about 25 mg to about 100 mg). In embodiments, about 60 mg elinzanetant or stereoisomer thereof, or an equivalent dose of a pharmaceutically acceptable salt or deuterated form thereof, is orally administered once a day (i.e., a total daily dose of about 60 mg).

In embodiments, elinzanetant or stereoisomer thereof, or an equivalent dose of a pharmaceutically acceptable salt or deuterated form thereof, is administered for at least about 14 days, e.g., 2 weeks, or 3 weeks, or 4 weeks, or 5 weeks, or 6 weeks, or 7 weeks, or 8 weeks, or 9 weeks, or 10 weeks, or 11 weeks, or 12 weeks, or 13 weeks, or 14 weeks, or 15 weeks, or 16 weeks, or 17 weeks, or 18 weeks, or 19 weeks, or 20 weeks, or 21 weeks, or 22 weeks, or 23 weeks, or 24 weeks, 48 weeks, 2 years, 4 years, or more.

In embodiments, the CYP3A4 inhibitor is a moderate CYP3A4 inhibitor. In embodiments, the moderate CYP3A4 inhibitor is amiodarone, aprepitant, avacopan, berotralstat, ciprofloxacin, cimetidine, clarithromycin, conivaptan, crizotinib, cyclosporine, diltiazem, duvelisib, dronedarone, erythromycin, fedratinib, fluconazole, fosamprenavir, fosaprepitant, fosnetupitant-palonosetron, grapefruit juice, imatinib, isavuconazole, lefamulin, letermovir, netupitant, nilotinib, ribociclib, schisandra, or verapamil.

In embodiments, the moderate CYP3A4 inhibitor is co-administered with elinzanetant at a dosage or dosing regimen specified in the FDA-approved drug label, published as of the filing date of the present disclosure, for that CYP3A4 inhibitor.

In embodiments, the moderate CYP3A4 inhibitor is amiodarone. In embodiments, amiodarone is co-administered for treating recurrent ventricular fibrillation and recurrent hemodynamically unstable ventricular tachycardia. In embodiments, amiodaron is co-administered at a loading dosage of 800-1600 mg/day until initial therapeutic response occurs (e.g., 1 to 3 weeks). In embodiments, amiodarone is co-administered, once adequate arrhythmia control is achieved or if side effects become prominent, at a reduced dosage of 600-800 mg/day for one month then to the maintenance dosage of 400 mg/day.

In embodiments, the moderate CYP3A4 inhibitor is aprepitant. In embodiments, aprepitant is co-administered for preventing chemotherapy induced nausea and vomiting. In embodiments, aprepitant is co-administered at a dosage of 125 mg orally 1 hour prior to chemotherapy treatment. In embodiments, aprepitant is co-administered at a dosage of 80 mg orally once daily. In embodiments, aprepitant is co-administered for preventing postoperative nausea and vomiting. In embodiments, aprepitant is co-administered at 40 mg within 3 hours prior to induction of anesthesia.

In embodiments, the moderate CYP3A4 inhibitor is ciprofloxacin. In embodiments, ciprofloxacin is co-administered for treating infections. In embodiments, ciprofloxacin is co-administered at a dosage shown in the Table below.

| DOSAGE AND ADMINISTRATION Adult Dosage Guidelines | | | |
|---|---|---|---|
| Infection | Dose | Frequency | Duration |
| Skin and Skin Structure | 500-750 mg | every 12 hours | 7 to 14 days |
| Bone and Joint | 500-750 mg | every 12 hours | 4 to 8 weeks |
| Complicated Intra-Abdominal | 500 mg | every 12 hours | 7 to 14 days |
| Infectious Diarrhea | 500 mg | every 12 hours | 5 to 7 days |
| Typhoid Fever | 500 mg | every 12 hours | 10 days |
| Uncomplicated Gonorrhea | 250 mg | single dose | single dose |
| Inhalational anthrax (post-exposure) | 500 mg | every 12 hours | 60 days |
| Plague | 500-750 mg | every 12 hours | 14 days |
| Chronic Bacterial Prostatitis | 500 mg | every 12 hours | 28 days |
| Lower Respiratory Tract | 500-750 mg | every 12 hours | 7 to 14 days |
| Urinary Tract | 250-500 mg | every 12 hours | 7 to 14 days |
| Acute Uncomplicated Cystitis | 250 mg | every 12 hours | 3 days |
| Acute Sinusitis | 500 mg | every 12 hours | 10 days |

In embodiments, the moderate CYP3A4 inhibitor is clarithromycin. In embodiments, clarithromycinis co-administered for treating mild to moderate infections caused by designated, susceptible bacteria. In embodiments, clarithromycin is co-administered at a dosage of 250 mg or 500 mg every 12 hours or 1 g every 24 hours.

In embodiments, the moderate CYP3A4 inhibitor is conivaptan. In embodiments, conivaptan is co-administered for raising serum sodium in hospitalized female subjects with euvolemic and hypervolemic hyponatremia. In embodiments, conivaptan is co-administered at a dosage of 20 mg once a day.

In embodiments, the moderate CYP3A4 inhibitor is cyclosporine. In embodiments, cyclosporine is co-administered for increasing tear production in female subjects with keratoconjunctivitis sicca (dry eye). In embodiments, cyclosporine is co-administered one drop (0.9 mg/mL solution) twice daily.

In embodiments, the moderate CYP3A4 inhibitor is diltiazem. In embodiments, diltiazem is co-administered for managing chronic stable angina and angina due to coronary artery spasm. In embodiments, diltiazem is co-administered 30 mg four times a day at bedtime (h.s.), or 180 mg to 360 mg per day.

In embodiments, the moderate CYP3A4 inhibitor is dronedarone. In embodiments, dronedarone is co-administered for reducing the risk of hospitalization for atrial fibrillation (AF) in patients in sinus rhythm with a history of paroxysmal or persistent AF. In embodiments, dronedarone is co-administered at a dosage of 400 mg twice a day.

In embodiments, the moderate CYP3A4 inhibitor is erythromycin. In embodiments, erythromycin is co-administered for treating bacterial infection. In embodiments, erythromycin is co-administered at a dosage of 400 mg every 6 hours or 4 g per day.

In embodiments, the moderate CYP3A4 inhibitor is fluconazole. In embodiments, fluconazole is co-administered for treating vaginal candidiasis, oropharyngeal and esophageal candidiasis, and cryptococcal meningitis. In embodiments, fluconazole is co-administered at a dosage of 150 mg or 200 mg as a single oral dose, or 50-400 mg once daily.

In embodiments, the moderate CYP3A4 inhibitor is imatinib. In embodiments, imatinib is co-administered for treating chronic myeloid leukemia (CML) in blast crisis, accelerated phase, or in chronic phase after failure of interferon-alpha therapy. In embodiments, imatinib is co-administered at dosage of 600 mg/day, 600-800 mg per day, or 400 mg twice a day.

In embodiments, the moderate CYP3A4 inhibitor is isavuconazole. In embodiments, isavuconazole is co-administered for treating invasive aspergillosis and invasive mucormycosis. In embodiments, isavuconazole is co-administered at a dosage of 372 mg every 8 hours for 6 doses or 372 mg once daily.

In embodiments, the moderate CYP3A4 inhibitor is verapamil. In embodiments, verapamil is co-administered for treating supraventricular tachyarrhythmias. In embodiments, verapamil is co-administered intravenously at a dosage of 5-10 mg. In embodiments, verapamil is orally co-administered at a dose of 120 mg a day. In embodiments, verapamil is orally co-administered at a dose of 120 mg, 180 mg, 240 mg, 360 mg, or 480 mg once daily.

In embodiments, the moderate CYP3A4 inhibitor is grapefruit juice.

In embodiments, the CYP3A4 inhibitor is a strong CYP3A4 inhibitor. In embodiments, the strong CYP3A4 inhibitor is adagrasib, atazanavir, ceritinib, clarithromycin, cobicistat, darunavir, elvitegravir and ritonavir, idelalisib, indinavir and ritonavir, itraconazole, ketoconazole, levoketoconazole, lopinavir, lopinavir and ritonavir, mifepristone, nefazodone, nelfinavir, nirmatrelvir-ritonavir, ombitasvir-paritaprevir-ritonavir, ombitasvir-paritaprevir-ritonavir plus dasabuvir, paritaprevir and ritonavir, posaconazole, ritonavir, ritonavir and ritonavir-containing coformulations, saquinavir, saquinavir and ritonavir, tucatinib, telithromycin, tipranavir and ritonavir, or voriconazole.

In embodiments, the present disclosure provides a method of treating vasomotor symptoms and/or sleep disturbances in a female subject in need thereof with elinzanetant or stereoisomer thereof, or an equivalent dose of a pharmaceutically acceptable salt or deuterated form thereof wherein the concomitant use of a strong CYP3A4 inhibitor with elinzanetant is not recommended. In embodiments, co-administration of the strong CYP3A4 inhibitor with elinzanetant is contraindicated. In embodiments, the female subject is currently treated with a strong CYP3A4 inhibitor and in need of treatment with elinzanetant, and the method comprises discontinuing the strong CYP3A4 inhibitor treatment, and then administering a reference dose of elinzanetant. In embodiments, the female subject is currently treated with elinzanetant and in need of treatment with a strong CYP3A4 inhibitor, the method comprising, discontinuing elinzanetant treatment, and then administering the strong CYP3A4 inhibitor treatment.

Patient Population

In embodiments, the present disclosure provides a method of treating vasomotor symptoms (VMS) in a female subject comprising administering elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, the present disclosure provides a method of treating VMS in a female subject comprising administering elinzanetant or stereoisomer thereof, or an equivalent dose of a pharmaceutically acceptable salt or deuterated form thereof, wherein the female subject is not undergoing concomitant treatment with a strong CYP3A4 inhibitor. In embodiments, the female subject has moderate to severe VMS. In embodiments, the female subject has moderate to severe VMS associated with menopause. In embodiments, the female subject has moderate to severe VMS caused/induced by adjuvant endocrine therapy. In embodiments, the severity of VMS is assessed according to the VMS assessment scale shown in Table 1. In embodiments, the female subject had a VMS score of 3 prior to administration. In embodiments, the female subject had a VMS score of 2 prior to administration.

TABLE 1

| | | Criteria for assessing VMS score |
|---|---|---|
| 0 | None | No symptoms |
| 1 | Mild | Sensation of heat without sweating |
| 2 | Moderate | Sensation of heat with sweating but able to continue activity |
| 3 | Severe | Sensation of heat with sweating, causing cessation of activity |

In embodiments, the female subject had at least 50 moderate to severe hot flashes (HFs, also known as "hot flushes"), including night-time HFs, per week, prior to treatment according to the present disclosure.

In embodiments, the female subject is an adult. In embodiments, the female subject is 40-65 years old, for example, 40-62 years old, 40-60 years old, 40-58 years old, 40-56 years old, 40-54 years old, 40-52 years old, 40-50 years old, or any values or ranges therebetween. In embodiments, the female subject is menopausal. In embodiments, the female subject is post-menopausal.

In embodiments, prior to administering elinzanetant, the female subject experienced one or more of:
  (i) at least 12 months (for example, at least 14 months, 18 months, 20 months, 22 months, 24 months, or any values or ranges therebetween) of spontaneous amenorrhea;
  (ii) at least 6 months (for example, at least 8 months, 10 months, 12 months, 14 months, 18 months, 20 months, 22 months, 24 months, or any values or ranges therebetween) of spontaneous amenorrhea with serum follicle-stimulating hormone (FSH) levels>40 mIU/mL and a serum estradiol concentration of <30 pg/mL;
  (iii) hysterectomy with serum FSH levels>40 mIU/mL and a serum estradiol concentration of <30 pg/mL, or
  (iv) surgical bilateral oophorectomy with or without hysterectomy.

In embodiments, prior to administering elinzanetant, the female subject experienced one or more of: (i) at least 12 months of spontaneous amenorrhea; (ii) at least 6 months of spontaneous amenorrhea with serum follicle-stimulating hormone (FSH) levels>40 mIU/mL and a serum estradiol concentration of <30 pg/mL; (iii) hysterectomy with serum FSH levels>40 mIU/mL and a serum estradiol concentration of <30 pg/mL, or (iv) surgical bilateral oophorectomy with or without hysterectomy.

In embodiments, the VMS is associated with menopause. In embodiments, the female subject has a moderate to severe hot flash (HF) associated with the menopause prior to the treatment. In embodiments, the female subject received an adjuvant endocrine therapy prior to the treatment. In embodiments, the VMS is induced by a prior adjuvant endocrine therapy. In embodiments, the female subject has sleep disturbance associated with menopause prior to the treatment. In embodiments, the female subject has hormone-receptor (HR) positive breast cancer. In embodiments, the female subject is treated with an adjuvant endocrine therapy. In embodiments, the female subject is treated with tamoxifen. In embodiments, the VMS is associated, induced or caused by anti-cancer therapy.

In embodiments, the present disclosure provides a method of treating sleep disturbances in female subjects comprising administering elinzanetant or stereoisomer thereof, or an equivalent dose of a pharmaceutically acceptable salt or deuterated form thereof, wherein the female subject is undergoing concomitant treatment with a moderate CYP3A4 inhibitor. In embodiments, sleep disturbances are associated with menopause. In embodiments, sleep disturbances are caused or induced by adjuvant endocrine therapy, such as adjuvant endocrine therapy in breast cancer patients. In embodiments, the breast cancer is HR-positive breast cancer. In embodiments, the female subject experienced 30 minutes or more wakefulness time after initially falling asleep prior to treatment. In embodiments, the present disclosure provides a method of decreasing wakefulness after sleep or increasing sleep efficiency in female subjects comprising administering elinzanetant or stereoisomer thereof, or an equivalent dose of a pharmaceutically acceptable salt or deuterated form thereof, wherein the female subject is undergoing concomitant treatment with a moderate CYP3A4 inhibitor.

Pharmaceutical Compositions and Formulations

In embodiments, elinzanetant or stereoisomer thereof, or an equivalent dose of a pharmaceutically acceptable salt or deuterated form thereof, is present in a pharmaceutical composition. In embodiments, the pharmaceutical composition comprises a therapeutically effective amount of elinzanetant or stereoisomer thereof, or an equivalent dose of a pharmaceutically acceptable salt or deuterated form thereof, and a pharmaceutically acceptable carrier or excipient. In embodiments, the pharmaceutical compositions of the present disclosure are formulated for oral administration.

In embodiments, elinzanetant or the pharmaceutical compositions of the present disclosure are administered by oral administration in the form of tablets, capsules, syrups, powders or granules. In embodiments, elinzanetant or stereoisomer thereof, or an equivalent dose of a pharmaceutically acceptable salt or deuterated form thereof, is orally administered in a pharmaceutical formulation. In embodiments, the pharmaceutical composition may be a solid, powder, liquid, or gel. In embodiments, the pharmaceutical is a solid (e.g., a powder, tablet, a capsule, granulates, and/or aggregates). In certain of such embodiments, the solid pharmaceutical composition comprises one or more excipients known in the art, including, but not limited to, starches, sugars, diluents, granulating agents, lubricants, binders, and disintegrating agents. In embodiments, the pharmaceutical formulation is a tablet or a capsule. In embodiments, the pharmaceutical formulation is a capsule. In embodiments, the capsule comprises edible ink, ferric oxide red, ferric oxide yellow, gelatin, sorbitol special-glycerin, and/or titanium dioxide.

For oral administration, elinzanetant, or pharmaceutically acceptable salt, deuterated form or stereoisomer thereof, may be admixed with an adjuvant or a carrier, for example, lactose, saccharose, sorbitol, mannitol; a starch, for example, potato starch, corn starch or amylopectin; a cellulose derivative; a binder, for example, gelatin or polyvinylpyrrolidone; and/or a lubricant, for example, magnesium stearate, calcium stearate, polyethylene glycol, a wax, paraffin, and the like, and then compressed into tablets. If coated tablets are required, the cores, prepared as described above, may be coated with a concentrated sugar solution which may contain, for example, gum arabic, gelatine, talcum and titanium dioxide. Alternatively, the tablet may be coated with a suitable polymer dissolved in a readily volatile organic solvent.

In embodiments, the pharmaceutical formulation comprises about 1 mg to about 100 mg of elinzanetant, or an equivalent dose of a pharmaceutically acceptable salt thereof. In embodiments, the pharmaceutical formulation is a capsule comprising 30 mg or 60 mg of elinzanetant, or an equivalent dose of a pharmaceutically acceptable salt thereof.

In embodiments, the pharmaceutical formulation comprises 60 mg of elinzanetant free base, all-rac-α-Tocopherol, caprylocaproyl macrogolglycerides, glycerol monocaprylocaprate, glycerol mono-oleate, and/or polysorbate 80.

Clinical Outcomes

In embodiments, the methods of the present disclosure reduce the frequency or severity of vasomotor symptoms compared to baseline. In embodiments, the vasomotor symptoms comprise hot flashes. In embodiments, the vasomotor symptoms comprise sleep disturbances.

In embodiments, the methods of the present disclosure comprising reducing the frequency of the vasomotor symptoms compared to baseline (i.e., prior to administration). In embodiments, the treatment comprises reducing the mean frequency of the vasomotor symptoms compared to baseline. In embodiments, the treatment comprises reducing the mean frequency of the vasomotor symptoms from baseline to Week 1, Week 4, Week 12, Week 24, or Week 26 of treatment. In embodiments, the treatment comprises reducing the frequency of the vasomotor symptoms by about 10% to about 100%, about 10% to about 95%, about 15% to about 95%, about 20% to about 95%, about 20% to about 80%, about 20% to about 70%, about 20% to about 60%, about 30% to about 80%, about 30% to about 70%, about 30% to about 60%, about 30% to about 95%, about 40% to about 95%, or about 50% to about 95% %, including any values or ranges therebetween, compared to the frequency prior to administration. In embodiments, the treatment comprises reducing the frequency of the vasomotor symptoms by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to the frequency prior to administration. In embodiments, the treatment comprises reducing the mean frequency of the vasomotor symptoms by about at least 30%, about 30-40%, or about 33-38% over 24 hours, following one week of treatment compared to baseline. In embodiments, the treatment comprises reducing the mean frequency of the vasomotor symptoms by about at least 50%, about 50-70%, about 50-60%, about 55-65%, or about 59% over 24 hours, following 4 weeks of treatment compared to baseline. In embodiments, the treatment comprises reducing the mean frequency of the vasomotor symptoms by about at least 60%, about 60-70%, or about 66% over 24 hours, following 12 weeks of treatment compared to baseline.

In embodiments, the methods of the present disclosure comprising reducing the severity of the vasomotor symptoms compared to baseline (i.e., prior to administration). In embodiments, the treatment comprises reducing the mean severity of the vasomotor symptoms compared to baseline. In embodiments, the treatment comprises reducing the mean severity of the vasomotor symptoms from baseline to Week 1, Week 4, Week 12, Week 24, or Week 26 of treatment. In embodiments, the treatment comprises reducing the severity of the vasomotor symptoms by about 10% to about 100%, about 10% to about 95%, about 15% to about 95%, about 20% to about 95%, about 30% to about 95%, about 40% to about 95%, about 50% to about 95%, about 20% to about 80%, about 20% to about 70%, about 20% to about 60%, about 20% to about 50%, about 20% to about 40%, about 30% to about 80%, about 30% to about 70%, or about 30% to about 60%, including any values or ranges therebetween, compared to the severity prior to administration. In embodiments, the treatment comprises reducing the severity of the vasomotor symptoms by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to the severity prior to administration. In embodiments, the method comprises reducing the mean severity of moderate to severe vasomotor symptoms by about at least 20%, about 20% to 40%, about 20% to 30%, about 25% to 35%, or about 29% over 24 hours, following one week treatment compared to baseline. In embodiments, the treatment comprises reducing the mean severity of moderate to severe vasomotor symptoms by about at least 30%, about 30-40%, or about 36% over 24 hours, following 12 weeks of treatment compared to baseline.

In embodiments, the methods of the present disclosure comprise reducing the frequency of moderate to severe vasomotor symptoms compared to baseline (i.e., prior to administration). In embodiments, the methods of the present disclosure reduce the mean frequency of moderate to severe vasomotor symptoms compared to baseline. In embodiments, the treatment comprises reducing the mean frequency of moderate to severe vasomotor symptoms from baseline to Week 1, Week 4, Week 12, Week 24, or Week 26 of treatment. In embodiments, at Week 12, the treatment comprises reducing about 2-12 moderate to severe vasomotor symptoms per day compared to baseline, for example, about 2-11 HF per day, about 2-10 HF per day, about 2-9 HF per day, 2-8 HF per day, 2-7 HF per day, 2-6 HF per day, 2-5 HF per day, 2-4 HF per day, 2-3 HF per day, about 3-12 HF per day, 3-11 HF per day, about 3-10 HF per day, about 3-9 HF per day, 3-8 HF per day, 3-7 HF per day, 3-6 HF per day, 3-5 HF per day, 3-4 HF per day, about 4-12 HF per day, 4-11 HF per day, about 4-10 HF per day, about 4-9 HF per day, 4-8 HF per day, 4-7 HF per day, 4-6 HF per day, 4-5 HF per day, about 5-12 HF per day, 5-11 HF per day, about 5-10 HF per day, about 5-9 HF per day, 5-8 HF per day, 5-7 HF per day, 5-6 HF per day, about 6-12 HF per day, 6-11 HF per day, about 6-10 HF per day, about 6-9 HF per day, 6-8 HF per day, 6-7 HF per day, about 7-12 HF per day, 7-11 HF per day, about 7-10 HF per day, about 7-9 HF per day, 7-8 HF per day, about 8-12 HF per day, or 9-11 HF per day, including any values or ranges therebetween. In embodiments, the treatment comprises reducing about 6-12 moderate to severe vasomotor symptoms per day compared to baseline. In embodiments, the treatment comprises reducing about 7-12 moderate to severe vasomotor symptoms per day compared to baseline. In embodiments, the treatment comprises reducing the frequency of moderate to severe vasomotor symptoms by about 10% to about 100%, about 10% to about 95%, about 15% to about 95%, about 20% to about 95%, about 30% to about 95%, about 40% to about 95%, about 50% to about 95%, about 20% to about 80%, about 20% to about 70%, about 20% to about 60%, about 20% to about 50%, about 20% to about 40%, about 30% to about 80%, about 30% to about 70%, or about 30% to about 60%, including any values or ranges therebetween, compared to the frequency prior to administration. In embodiments, the treatment comprises reducing the frequency of moderate to severe vasomotor symptoms by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to the frequency prior to administration. In embodiments, the treatment comprises reducing the mean frequency of moderate to severe vasomotor symptoms by about at least 30%, about 30-50%, about 30-40%, about 35-45%, or about 38% over 24 hours, following one week of treatment compared to baseline. In embodiments, the treatment comprises reducing the mean frequency of moderate to severe vasomotor symptoms by about at least 50%, about 50-70%, about 50-60%, about 55-65%, or about 57% over 24 hours, following 4 weeks of treatment compared to baseline. In embodiments, the treatment comprises reducing the mean frequency of moderate to severe vasomotor symptoms by about at least 60%, about 60-70%, or about 64% over 24 hours, following 12 weeks of compared to baseline.

In embodiments, the methods of the present disclosure comprise decreasing the patient-reported outcomes measurement information system sleep disturbance short form 8b (PROMIS SD SF 8b) total T-score (total 40 scores, with higher scores indicating greater severity of sleep disturbance) from baseline (i.e., prior to administration). In embodiments, the present disclosure provides a method of improving sleep quality, sleep depth and restoration associated with sleep, perceived difficulties with getting to sleep or staying asleep, perceptions of the adequacy of, and satisfaction with sleep. In embodiments, the treatment comprises decreasing the mean PROMIS SD SF 8b total T-score from baseline to Week 1, Week 4, Week 12, Week 24, or Week 26 of treatment. In embodiments, the method comprises decreasing the PROMIS SD SF 8b total T-score by about 10% to about 100%, about 10% to about 95%, about 15% to about 95%, about 20% to about 95%, about 30% to about 95%, about 40% to about 95%, about 20% to about 80%, about 20% to about 70%, about 20% to about 60%, about 20% to about 50%, about 20% to about 40%, about 30% to about 80%, about 30% to about 70%, about 30% to about 60%, or about 50% to about 95%, including any values or ranges therebetween, compared to prior to administration. In embodiments, the method comprises decreasing the PRO- MIS SD SF 8b total T-score by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration. In embodiments, the treatment comprises decreasing the PROMIS SD SF 8b total T-score by about 1, 2, 3, 4, 5, 6, 7, 8, 9, 10, 11, 12, 13, 14, 15, 16, 17, 18, 19, 20, 21, 22, 23, 24, 25, 26, 26, 27, 28, 29, 30, 31, 32, 33, 34, 35, 36, 37, 38, 39, or 40 points, including all ranges therein. In embodiments, the treatment comprises decreasing the PROMIS SD SF 8b total T-score by about 1 to 40 points, about 1 to 35 points, about 1 to 30 points, about 1 to 25 points, about 1 to 20 points, about 1 to 15 points, about 1 to 10 points, about 1 to 8 points, about 1 to 6 points, about 2 to 8 points, about 2 to 6 points, about 3 to 8 points, including any values or ranges therebetween. In embodiments, the treatment comprises decreasing the PROMIS SD SF 8b total T-score by about 3 to about 7 points, following 12 weeks of treatment compared to baseline.

In embodiments, the methods of the present disclosure comprise decreasing a menopause specific quality of life scale (MENQOL) total score (total score ranging 1-8) from baseline (i.e., prior to administration). In embodiments, the treatment comprises decreasing the mean MENQOL score from baseline to Week 1, Week 4, Week 12, Week 24, or Week 26 of treatment. In embodiments, the treatment comprises decreasing the MENQOL total score by about 10% to about 95%, about 15% to about 95%, about 20% to about 95%, about 30% to about 95%, about 40% to about 95%, about 50% to about 95%, about 10% to about 90%, about 10% to about 80%, about 10% to about 70%, about 10% to about 60%, about 10% to about 50%, about 20% to about 80%, about 20% to about 70%, about 20% to about 60%, about 20% to about 50%, about 20% to about 40%, about 30% to about 80%, about 30% to about 70%, or about 30% to about 60%, including any values or ranges therebetween, compared to prior to administration. In embodiments, the treatment comprises decreasing the MENQOL total score by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration. In embodiments, the method comprises decreasing the MENQOL total score by about 0.5, 1, 2, 3, 4, 5, 6, 7, or 8 points, including any values or ranges therebetween. In embodiments, the method comprises decreasing the MENQOL total score by about 0.2 to about 0.6 points, following 12 weeks of treatment compared to baseline.

In embodiments, the methods of the present disclosure comprise decreasing the Beck depression inventory (BDI-II, total score ranging from 0 to 63) total score from baseline (i.e., prior to administration). In embodiments, the treatment comprises decreasing the mean BDI-II score from baseline to Week 1, Week 4, Week 12, Week 24, or Week 26 of treatment. In embodiments, the treatment comprises decreasing the BDI-II total score by about 10% to about 95%, about 15% to about 95%, about 20% to about 95%, about 30% to about 95%, about 40% to about 95%, about 50% to about 95%, about 10% to about 90%, about 10% to about 80%, about 10% to about 70%, about 10% to about 60%, about 10% to about 50%, about 20% to about 80%, about 20% to about 70%, about 20% to about 60%, about 20% to about 50%, about 20% to about 40%, about 30% to about 80%, about 30% to about 70%, about 30% to about 60%, including any values or ranges therebetween, compared to prior to administration. In embodiments, the treatment comprises decreasing the BDI-II total score by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration. In embodiments, the method comprises decreasing the BDI-II total score by about 1 to 63 points, about 1 to 60 points, about 1 to 55 points, about 1 to 50 points, about 1 to 45 points, about 1 to 40 points, about 1 to 35 points, about 1 to 30 points, about 1 to 25 points, about 1 to 20 points, about 1 to 15 points, about 1 to 10 points, about 2 to 10 points, about 3 to 10 points, about 4 to 10 points, about 5 to 10 points, about 2 to 20 points, about 3 to 20 points, about 4 to 20 points, about 5 to 20 points. In embodiments, the method comprises decreasing the BDI-II total score by about 1, 2, 3, 4, 5, 6, 7, 8, 9, 10, 11, 12, 13, 14, 15, 16, 17, 18, 19, 20, 21, 22, 23, 24, 25, 26, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, or 63 points, including any ranges therebetween.

In embodiments, the methods of the present disclosure comprise decreasing the total number of minutes that a female subject is awake after having initially fallen asleep (Wakefulness After Sleep Onset, WASO), determined by polysomnography (PSG) by about 10% to about 95%, about 15% to about 90%, about 20% to about 85%, about 30% to about 80%, about 40% to about 75%, about 50% to about 70%, about 10% to about 90%, about 15% to about 85%, about 20% to about 80%, about 30% to about 75%, or about 40% to about 70%, including any values or ranges therebetween, compared to prior to administration, following 4 weeks or 12 weeks of treatment. In embodiments, the methods of the present disclosure comprise decreasing the total number of minutes that a female subject is awake after having initially fallen asleep WASO, determined by PSG by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration, following 4 weeks or 12 weeks of treatment.

In embodiments, the methods of the present disclosure comprise increasing sleep efficiency determined by ratio between the total time a female subject is asleep (TST) to the total time spent in bed by about 10% to about 95%, about 15% to about 90%, about 20% to about 85%, about 30% to about 80%, about 40% to about 75%, about 50% to about 70%, about 10% to about 90%, about 15% to about 85%, about 20% to about 80%, about 30% to about 75%, or about 40% to about 70%, including any values or ranges therebetween, compared to prior to administration, following 4 weeks or 12 weeks of treatment. In embodiments, the methods of the present disclosure comprise increasing sleep efficiency determined by ratio between the total time a female subject is asleep (TST) to the total time spent in bed by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration, following 4 weeks or 12 weeks of treatment.

In embodiments, the methods of the present disclosure comprise decreasing Insomnia Severity Index (ISI) by about 10% to about 95%, about 15% to about 90%, about 20% to about 85%, about 30% to about 80%, about 40% to about 75%, about 50% to about 70%, about 10% to about 90%, about 15% to about 85%, about 20% to about 80%, about 30% to about 75%, or about 40% to about 70%, including any values or ranges therebetween, compared to prior to administration, following 4 weeks or 12 weeks of treatment. In embodiments, the methods of the present disclosure comprise decreasing Insomnia Severity Index (ISI) by at least about 5%, at least about 6%, at least about 7%, at least about 8%, at least about 9%, at least about 10%, at least about 20%, at least about 30%, at least about 40%, at least about 50%, at least about 60%, at least about 70%, at least about 80%, at least about 90%, at least about 95%, or at least about 100%, including any values or ranges therebetween, compared to prior to administration, following 4 weeks or 12 weeks of treatment. In embodiments, the method comprises decreasing the ISI score by about 1 to 28 points, about 1 to 20 points, about 1 to 18 points, about 1 to 16 points, about 1 to 14 points, about 1 to 12 points, about 1 to 10 points, about 1 to 8 points, about 1 to 6 points, about 1 to 20 points, about 2 to 10 points, about 2 to 5 points, about 3 to 10 points, about 4 to 10 points, about 5 to 10 points, about 6 to 10 points, about 3 to 20 points, about 3 to 10 points, about 3 to 8 points, or about 4 to 10 points, including any values or ranges therebetween. In embodiments, the method comprises decreasing the ISI score by about 1, 2, 3, 4, 5, 6, 7, 8, 9, 10, 11, 12, 13, 14, 15, 16, 17, 18, 19, 20, 21, 22, 23, 24, 25, 26, 26, 27, or 28 points, including any values or ranges therebetween.

Numbered Embodiments

1. A method of treating vasomotor symptoms in a female subject in need thereof, comprising administering a daily dose of about 25 mg to about 100 mg of elinzanetant or stereoisomer thereof, or an equivalent dose of a pharmaceutically acceptable salt or deuterated form thereof, wherein the female subject is undergoing concomitant treatment with a moderate CYP3A4 inhibitor.

2. A method of treating vasomotor symptoms in a female subject in need thereof, comprising administering about 25% to about 75% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor; and wherein the reference dose of elinzanetant is a daily dose of about 100 mg to about 160 mg.

3. The method of embodiment 2, wherein the reference dose of elinzanetant is a daily dose of about 120 mg.

4. The method of embodiment 2 or 3, comprising administering 50% of the reference dose of elinzanetant.

5. The method of any one of embodiments 1-4, wherein about 30 mg of elinzanetant is administered once a day.

6. The method of any one of embodiments 1-4, wherein about 60 mg of elinzanetant is administered once a day.

7 The method of any one of embodiments 1-4, wherein about 90 mg of elinzanetant is administered once a day.

8 The method of any one of embodiments 1-7, further comprising treating sleep disturbances associated with vasomotor symptoms.

9. The method of any one of embodiments 1-8, wherein elinzanetant is administered once a day.

10. The method of any one of embodiments 1-9, wherein elinzanetant is administered at bedtime (h.s.).

11. The method of any one of embodiments 1-10, wherein the female subject has moderate to severe vasomotor symptoms prior to administering elinzanetant.

12. The method of any one of embodiments 1-11, wherein the female subject is an adult.

13. The method of any one of embodiments 1-12, wherein the female subject is 40-65 years old.

14. The method of any one of embodiments 1-13, wherein the female subject is menopausal.

15. The method of embodiment 14, wherein prior to administering elinzanetant, the female subject experienced:
 (i) at least 12 months of spontaneous amenorrhea;
 (ii) at least 6 months of spontaneous amenorrhea with serum follicle-stimulating hormone (FSH) levels>40 mIU/mL and a serum estradiol concentration of <30 pg/mL;
 (iii) hysterectomy with serum FSH levels>40 mIU/mL and a serum estradiol concentration of <30 pg/mL; or
 (iv) surgical bilateral oophorectomy with or without hysterectomy.

16. The method of any one of embodiments 1-15, wherein the vasomotor symptoms are caused by adjuvant endocrine therapy.

17. The method of any one of embodiments 1-15, wherein the vasomotor symptoms are associated with menopause.

18. The method of any one of embodiments 1-16, wherein the moderate CYP3A4 inhibitor is amiodarone, aprepitant, ciprofloxacin, clarithromycin, conivaptan, crizotinib, cyclosporine, diltiazem, dronedarone, erythromycin, fluconazole, grapefruit juice, imatinib, isavuconazole, or verapamil.

19. The method of any one of embodiments 1-18, comprising reducing the frequency of the vasomotor symptoms compared to baseline.

20. The method of any one of embodiments 1-19, comprising reducing the severity of the vasomotor symptoms compared to baseline.

21. The method of any one of embodiments 1-20, comprising reducing the frequency of moderate to severe hot flash (HF) from baseline.

22. The method of any one of embodiments 1-21, comprising decreasing a Patient-Reported Outcomes Measurement Information System Sleep Disturbance Short Form 8b (PROMIS SD SF 8b) total T-score compared to baseline.

23. The method of any one of embodiments 1-22, comprising decreasing a menopause specific quality of life scale (MENQOL) total score compared to baseline.

24. The method of any one of embodiments 1-23, comprising decreasing a Beck depression inventory (BDI-II) total score compared to baseline.

25. A method of treating vasomotor symptoms and/or sleep disturbances in a female subject in need thereof, comprising administering about 25 mg to about 100 mg of elinzanetant or stereoisomer thereof, or an equivalent dose of a pharmaceutically acceptable salt or deuterated form thereof, wherein the female subject is undergoing concomitant treatment with a moderate CYP3A4 inhibitor.

26. A method of treating vasomotor symptoms and/or sleep disturbances in a female subject in need thereof, comprising administering about 25% to about 75% of a reference dose of elinzanetant or stereoisomer thereof, or an equivalent dose of a pharmaceutically acceptable salt or deuterated form thereof, wherein the female subject is undergoing concomitant treatment with a moderate CYP3A4 inhibitor; and wherein the reference dose of elinzanetant is about 100 mg to about 160 mg.

27. A method of treating vasomotor symptoms in a female subject in need thereof with elinzanetant or stereoisomer thereof or an equivalent dose of a pharmaceutically acceptable salt or deuterated form thereof, wherein concomitant use of the strong CYP3A4 inhibitor with elinzanetant is not recommended.

28. The method according to embodiment 27, wherein concomitant use is contraindicated.

29. The method of embodiment 27 or 28, wherein the female subject is currently treated with a strong CYP3A4 inhibitor and in need of treatment with elinzanetant, the method comprising, discontinuing the strong CYP3A4 inhibitor treatment; and then administering a reference dose of elinzanetant.

30. The method of embodiment 27 or 28, wherein the female subject is currently treated with elinzanetant and in need of treatment with a strong CYP3A4 inhibitor, the method comprising, discontinuing elinzanetant treatment; and then administering the strong CYP3A4 inhibitor treatment.

EXAMPLES

Example 1. Pharmacokinetic Analysis of Concomitant Use of Elinzanetant with a Strong CYP3A4 Inhibitor A clinical pharmacokinetic assessment of the effect of concomitant administration of elinzanetant with a strong CYP3A4 inhibitor, itraconazole, was conducted. The female subjects were administered 120 mg of elinzanetant alone and subsequently concomitantly administered with 120 mg of elinzanetant in the presence of itraconazole, at the dosage specified in the FDA-approved drug label. The results obtained from clinical studies of elinzanetant alone or after concomitant administration with itraconazole were analyzed and further used to develop the physiologically based pharmacokinetic (PBPK) model used to evaluate the drug-drug interaction profile for elinzanetant. Treatment-emergent adverse events (TEAEs) observed in the elinzanetant development studies include fatigue, somnolence, dizziness, abnormal elevations in alanine aminotransferase (ALT) or aspartate aminotransferase (AST) liver enzyme levels.

Using the PBPK model, the area under the concentration curve (AUC) and the maximum plasma concentration ($C_{max}$) geometric mean ratios (90% confidence internal) of 120 mg elinzanetant following coadministration with itraconazole were predicted as 6.10 (CI: 5.41-6.98) and 3.26 (CI: 2.86-3.71), respectively, compared to those observed when 120 mg of elinzanetant was administered alone. As elinzanetant has complicated pharmacokinetics, including high sensitivity to plasma protein binding and circadian rhythm fluctuation, the PBPK model was adjusted to include a modified fraction unbound ($f_u$) with a scaling factor of 1.25 in the presence of itraconazole. After incorporating the modified $f_u$ with the scaling factor, the predicted geometric AUC and $C_{max}$ mean ratios of elinzanetant were about 4.91 (CI: 4.36-5.57) and about 2.76-fold (CI: 2.43-3.13), respectively, relative to 120 mg of elinzanetant alone. The observed AUC and $C_{max}$ geometric mean ratios of elinzanetant in the clinical study with itraconazole were 4.84 (CI: 4.02-5.83) for AUC and 3.31 (CI: 2.74-4.00) for $C_{max}$, respectively, and were consistent with the predicted AUC and $C_{max}$ ratios from PBPK modeling.

In summary, due to the significant increase in elinzanetant AUC and $C_{max}$ following co-administration with itraconazole, concomitant administration of elinzanetant at a dose of 120 mg with a strong CYP3A4 inhibitor, such as itraconazole, was not recommended.

A low dose elinzanetant (10 mg, 20 mg, 30 mg, 40 mg, 50 mg, or 60 mg) was evaluated for safety and efficacy of elinzanetant in vasomotor symptoms treatment following coadministration with a moderate CYP3A4 inhibitor (e.g., erythromycin) to evaluate the significance of this interaction, as described in Example 2.

Example 2. Pharmacokinetic Analysis of Concomitant Use of Elinzanetant with a Moderate CYP3A4 Inhibitor An assessment to evaluate concomitant administration of 60 mg or 120 mg of elinzanetant with a moderate CYP3A inhibitor, erythromycin, was conducted utilizing PBPK modeling as described in Example 1 along with a drug-drug interaction model for erythromycin. For erythromycin, the dosage specified in the FDA-approved drug label was used in the study.

The AUC and $C_{max}$ geometric mean ratios of elinzanetant following co-administration with itraconazole or erythromycin, compared to those observed when 120 mg of elinzanetant was administered alone, are summarized in Table A.

TABLE A

| Geometric mean ratios | | |
|---|---|---|
| | AUC Ratio vs EZN 120 (90% CI) | $C_{max}$ Ratio vs EZN 120 (90% CI) |
| Strong inhibitor (itraconazole) + EZN 120 mg | 6.10 (5.41-6.98) | 3.26 (2.86-3.71) |
| Moderate inhibitor (erythromycin) + EZN 120 mg | 3.01 (2.71-3.33) | 2.00 (1.83-2.19) |
| Moderate inhibitor (erythromycin) + EZN 60 mg | 1.39 (1.25-1.56) | 0.96 (0.87-1.06) |

The physiologically based pharmacokinetic (PBPK) modeling predictions after co-administration of 120 mg elinzanetant with a moderate CYP3A4 inhibitor erythromycin showed a 3.0-fold increase of AUC and 2.0-fold increase for $C_{max}$ of elinzanetant. The PK profile for the administration of 120 mg elinzanetant with a moderate CYP3A4 presents an unacceptable increase in exposure to elinzanetant and risk of adverse events. However, the PBPK modeling predictions after co-administration of 60 mg elinzanetant with a moderate CYP3A4 inhibitor showed a 1.39-fold increase of AUC and 0.96-fold increase for $C_{max}$ of elinzanetant. The PK profile predicted for the co-administration of 60 mg elinzanetant with a moderate CYP3A4 inhibitor is within the therapeutically effective window.

For all simulation conditions, the highest recommended dose of CYP3A4 inhibitor (erythromycin) was selected. Duration of treatment was selected using preliminary PBPK simulations to ensure steady state. The effective time of the first administration was set to t=0. The feeding conditions were set to fasted. The simulation designs are summarized in Table B.

TABLE B

Simulation design of simulated DDI study of elinzanetant with a moderate CYP3A4 inhibitor

| YP3A4 moderate inhibitor | CYP3A4 inhibitor dose per day | Schedule | Offset[a] | Elin- zanetant dose | Schedule for elinzanetant |
|---|---|---|---|---|---|
| Erythromycin | 1500 mg/day | 500 mg TID for 21 days | 0 h | 60/120 mg | OD for 21 days |

[a]Time interval between a moderate CYP3A4 inhibitor administration and elinzanetant dose.

Figure 2:
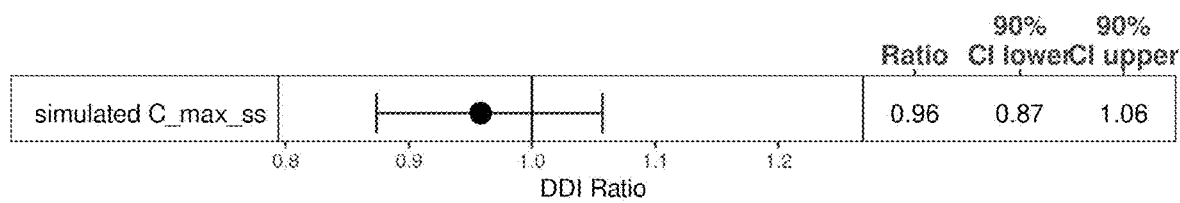
FIG. 2 illustrates the geometric mean ratio (90% CI) of steady state $C_{max}$ following concomitant administration of 60 mg elinzanetant with a moderate CYP3A4 inhibitor, erythromycin, compared to 120 mg elinzanetant alone, as described in Example 2.
Figure 3:
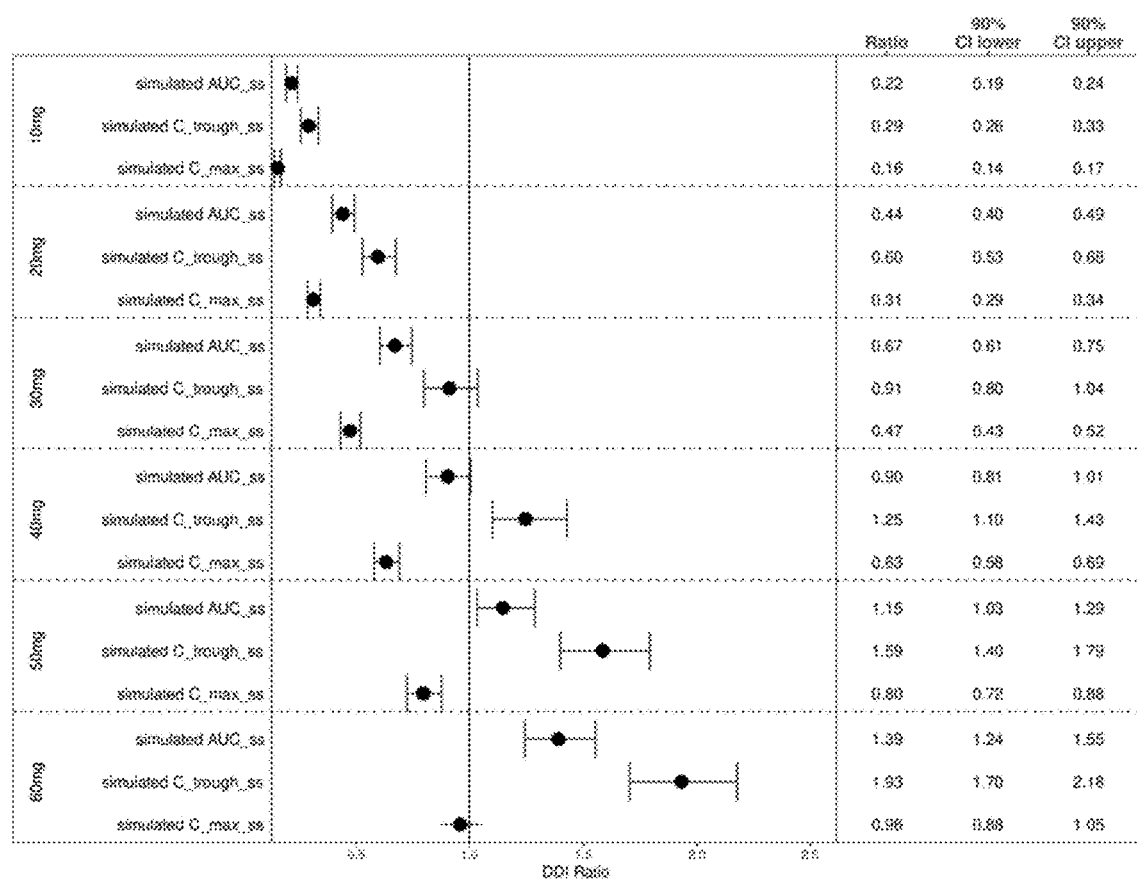
FIG. 3 illustrates the geometric mean ratios (90% CI) of simulated steady state AUC, $C_{max}$, and $C_{trough}$ following concomitant administration of 10 mg, 20 mg, 30 mg, 40 mg, 50 mg, and 60 mg of elinzanetant with a moderate CYP3A4 inhibitor, erythromycin, compared to 120 mg elinzanetant administration alone, as described in Example 2.
Figure 4:
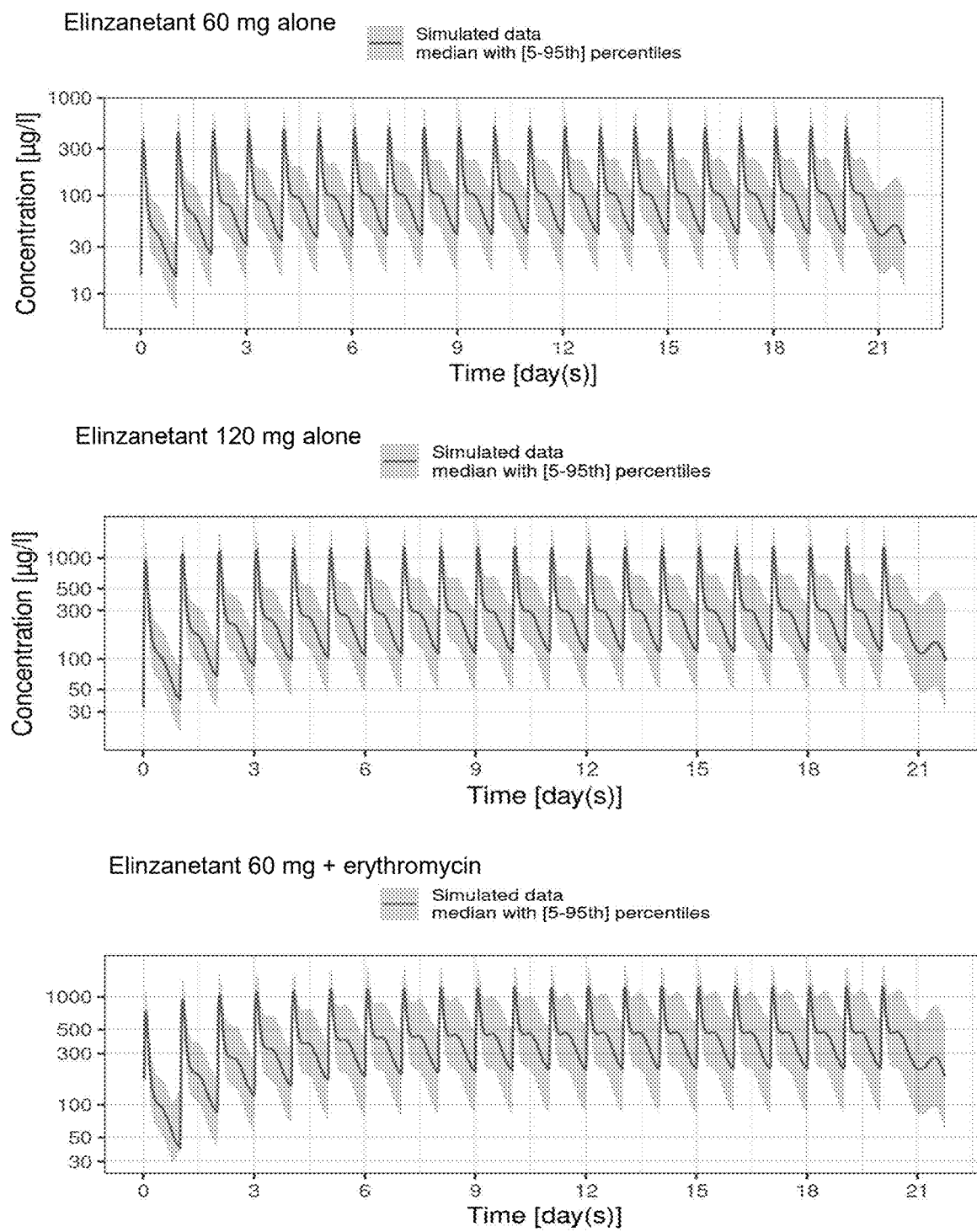
FIG. 4 illustrates the changes in the predicted median plasma concentration (μg/L) of elinzanetant over time (days) following 60 mg elinzanetant alone, 120 mg elinzanetant alone, and 60 mg elinzanetant in the presence of erythromycin, as described in Example 2.

To assess the drug-drug interaction (DDI) potential of low dose elinzanetant when co-administered with erythromycin, PBPK simulations were conducted evaluating the geometric mean ratios (DDI ratios) of AUC, $C_{trough}$, and $C_{max}$ following co-administration of 10 mg, 20 mg, 30 mg, 40 mg, 50 mg, or 60 mg elinzanetant with erythromycin, compared to administration of 120 mg elinzanetant alone. As illustrated in FIGS. 1-3, concomitant use of 60 mg elinzanetant with erythromycin resulted in a 1.39-fold increase in AUC $(0-24)_{ss}$ (90% CI: 1.25-1.56) and a 1.91-fold increase in $C_{trough,ss}$ (90% CI: 1.69-2.17), while $C_{max}$ remained unchanged (0.96-fold; 90% CI: 0.87-1.06), which is in the acceptable range for safety and efficacy. Concomitant use of 10 or 20 mg elinzanetant with erythromycin resulted in subtherapeutic AUC $(0-24)_{ss}$, $C_{trough,ss}$, and $C_{max}$. Concomitant use of 30 mg elinzanetant with erythromycin resulted in subtherapeutic AUC $(0-24)_{ss}$ and $C_{max}$, while $C_{trough,ss}$ was similar to 120 mg elinzanetant alone. Concomitant use of 40 or 50 mg with elinzanetant resulted in similar AUC $(0-24)_{ss}$ and $C_{trough,ss}$ but lower $C_{max}$ compared to 120 mg elinzanetant alone. Furthermore, the pharmacokinetic concentration vs time curves as shown in FIG. 4 demonstrate that the plasma concentrations of 60 mg elinzanetant with erythromycin are similar to the plasma concentrations of 120 mg elinzanetant alone, while the plasma concentrations achieved by 60 mg elinzanetant alone are lower than 120 mg alone. It is known that 120 mg elinzanetant alone is safe and effective for treatment of vasomotor symptoms and/or sleep disturbances associated with menopause, while doses of less than 120 mg elinzanetant do not show significant efficacy. Thus, achieving a similar pharmacokinetic profile through administration of 60 mg of elinzanetant plus a moderate CYP3A4 inhibitor is to be expected to yield similar safety and efficacy.

In summary, PBPK modeling indicates that co-administration of 60 mg elinzanetant with a moderate CYP3A4 inhibitor erythromycin yields a comparable pharmacokinetic profile, specifically providing sufficient systemic exposure to achieve similar safety and efficacy in treating vasomotor symptoms and/or sleep disturbances, such as sleep disturbances associated with menopause, as 120 mg elinzanetant administered alone. Based on these findings, a reduced elinzanetant dose of 60 mg is recommended for patients concurrently taking moderate CYP3A4 inhibitors.

The invention claimed is:

1. A method of treating vasomotor symptoms in a female subject in need thereof, comprising administering a daily dose of about 25 mg to about 100 mg of elinzanetant or stereoisomer thereof, or an equivalent dose of a pharmaceutically acceptable salt or deuterated form thereof,
   wherein the female subject is undergoing concomitant treatment with a moderate CYP3A4 inhibitor.

2. The method of claim 1, wherein about 30 mg of elinzanetant is administered once a day.

3. The method of claim 1, wherein about 60 mg of elinzanetant is administered once a day.

4. The method of claim 1, wherein about 90 mg of elinzanetant is administered once a day.

5. The method of claim 1, further comprising treating sleep disturbances associated with vasomotor symptoms.

6. The method of claim 1, wherein elinzanetant is administered once a day.

7. The method of claim 1, wherein elinzanetant is administered at bedtime (h.s.).

8. The method of claim 1, wherein the female subject has moderate to severe vasomotor symptoms prior to administering elinzanetant.

9. The method of claim 1, wherein the female subject is an adult.

10. The method of claim 1, wherein the female subject is 40-65 years old.

11. The method of claim 1, wherein the female subject is menopausal.

12. The method of claim 11, wherein prior to administering elinzanetant, the female subject experienced:
   (i) at least 12 months of spontaneous amenorrhea;
   (ii) at least 6 months of spontaneous amenorrhea with serum follicle-stimulating hormone (FSH) levels>40 mIU/mL and a serum estradiol concentration of <30 pg/mL;
   (iii) hysterectomy with serum FSH levels>40 mIU/mL and a serum estradiol concentration of <30 pg/mL; or
   (iv) surgical bilateral oophorectomy with or without hysterectomy.

13. The method of claim 1, wherein the vasomotor symptoms are caused by adjuvant endocrine therapy.

14. The method of claim 1, wherein the vasomotor symptoms are associated with menopause.

15. The method of claim 1, wherein the moderate CYP3A4 inhibitor is amiodarone, aprepitant, ciprofloxacin, clarithromycin, conivaptan, crizotinib, cyclosporine, diltiazem, dronedarone, erythromycin, fluconazole, grapefruit juice, imatinib, isavuconazole, or verapamil.

16. The method of claim 1, comprising reducing the frequency of the vasomotor symptoms compared to baseline.

17. The method of claim 1, comprising reducing the severity of the vasomotor symptoms compared to baseline.

18. The method of claim 1, comprising reducing the frequency of moderate to severe hot flash (HF) from baseline.

19. The method of claim 1, comprising decreasing a Patient-Reported Outcomes Measurement Information System Sleep Disturbance Short Form 8b (PROMIS SD SF 8b) total T-score compared to baseline.

20. The method of claim 1, comprising decreasing a menopause specific quality of life scale (MENQOL) total score compared to baseline.

21. The method of claim 1, comprising decreasing a Beck depression inventory (BDI-II) total score compared to baseline.

22. The method of claim 3, comprising reducing the frequency of the vasomotor symptoms by about 50-70% compared to baseline.

23. The method of claim 3, comprising reducing the severity of the vasomotor symptoms by about 30-40% compared to baseline.

24. The method of claim 3, comprising reducing the frequency of moderate to severe hot flash (HF) from baseline.

25. The method of claim 3, comprising decreasing a Patient-Reported Outcomes Measurement Information System Sleep Disturbance Short Form 8b (PROMIS SD SF 8b) total T-score compared to baseline.

26. The method of claim 3, comprising decreasing a menopause specific quality of life scale (MENQOL) total score compared to baseline.

27. The method of claim 3, comprising decreasing a Beck depression inventory (BDI-II) total score compared to baseline.

* * * * *